(12) United States Patent
Blanchard et al.

(10) Patent No.: US 9,976,683 B2
(45) Date of Patent: May 22, 2018

(54) QUICK FILL FLUID CONNECTOR

(71) Applicant: Marshall Excelsior Company, Marshall, MI (US)

(72) Inventors: Frederick W. Blanchard, Battle Creek, MI (US); James C. Zuck, Marshall, MI (US)

(73) Assignee: MARSHALL EXCELSIOR COMPANY, Marshall, MI (US)

( * ) Notice: Subject to any disclaimer, the term of this patent is extended or adjusted under 35 U.S.C. 154(b) by 392 days.

(21) Appl. No.: 14/663,704

(22) Filed: Mar. 20, 2015

(65) Prior Publication Data

US 2015/0192235 A1    Jul. 9, 2015

Related U.S. Application Data

(60) Division of application No. 12/848,635, filed on Aug. 2, 2010, now Pat. No. 9,010,814, which is a continuation-in-part of application No. 12/103,529, filed on Apr. 15, 2008, now Pat. No. 7,766,039.

(51) Int. Cl.
| | | |
|---|---|---|
| F16L 21/06 | (2006.01) | |
| F16L 37/12 | (2006.01) | |
| F16L 37/32 | (2006.01) | |

(52) U.S. Cl.
CPC .......... F16L 37/1215 (2013.01); F16L 37/32 (2013.01); *F17C 2205/037* (2013.01)

(58) Field of Classification Search
USPC .............................. 285/322, 316, 317, 34, 18
See application file for complete search history.

(56) References Cited

U.S. PATENT DOCUMENTS

| | | | |
|---|---|---|---|
| 729,479 A | 5/1903 | Wittman | |
| 940,678 A | 11/1909 | Doane et al. | |
| 951,889 A | 3/1910 | Teuer | |
| 1,150,420 A | 8/1915 | Davis et al. | |
| 1,480,555 A | 1/1924 | Ingram | |
| 1,505,722 A | 8/1924 | Merz | |
| 2,070,013 A | 2/1937 | Krannak | |
| 2,388,179 A * | 10/1945 | Prowd ................ | F16L 37/1215 285/315 |
| 3,071,188 A * | 1/1963 | Raulins ................ | E21B 33/038 166/340 |
| 3,680,893 A | 8/1972 | Giraud | |

(Continued)

*Primary Examiner* — Aaron M Dunwoody
(74) *Attorney, Agent, or Firm* — Howard & Howard Attorneys PLLC

(57) ABSTRACT

A fluid connector having a longitudinal axis and selective open and closed conditions, includes an elongate conduit member extending along the longitudinal axis, an annular collar disposed about and having axial movement relative to the conduit member between the connector open and closed conditions, and a plurality of split nut members circumferentially distributed about the conduit member and having axial movement relative to the collar between the connector open and closed conditions. The plurality of split nut members and the collar are jointly rotatably about the longitudinal axis, and each split nut member has a distal end defining a threaded nut segment. The split nut member distal ends in the connector closed condition are constrained by the collar against radially separating movement relative to the longitudinal axis and cooperatively define a nut configured to threadedly engage a mating fluid fitting.

18 Claims, 18 Drawing Sheets

(56) References Cited

U.S. PATENT DOCUMENTS

| | | | |
|---|---|---|---|
| 4,214,728 A | | 7/1980 | Fleischer |
| 4,220,360 A | | 9/1980 | Jacek |
| 4,444,419 A | | 4/1984 | Maeshiba |
| 4,807,578 A | | 2/1989 | Adams et al. |
| 5,323,808 A | | 1/1994 | Shimizu |
| 5,330,235 A | | 7/1994 | Wagner et al. |
| 5,649,723 A | | 7/1997 | Larsson |
| 5,788,443 A | * | 8/1998 | Cabahug ............ F16B 37/0857 285/34 |
| 5,964,485 A | | 10/1999 | Hame et al. |
| 6,343,630 B1 | | 2/2002 | Dubinsky |
| 6,655,498 B1 | | 12/2003 | Sasa et al. |
| 7,490,864 B2 | | 2/2009 | Cheng |
| 7,766,039 B2 | | 8/2010 | Zuck |
| 7,793,914 B2 | | 9/2010 | Danielson |
| 7,857,361 B1 | * | 12/2010 | Hanser ................ F16L 37/1215 285/314 |
| 7,874,314 B2 | | 1/2011 | Zuck |
| 7,972,158 B2 | * | 7/2011 | Wild .................. H01R 13/6277 439/257 |
| 8,844,979 B2 | * | 9/2014 | Danielson ........... F16L 37/1215 137/798 |
| 8,851,446 B2 | * | 10/2014 | Nimberger .............. F16K 35/02 251/107 |
| 2003/0025326 A1 | | 2/2003 | Schulte |
| 2004/0000788 A1 | * | 1/2004 | Cronley .............. F16L 37/1215 285/34 |
| 2004/0164547 A1 | | 8/2004 | Cronley |
| 2007/0152443 A1 | | 7/2007 | Cheng |
| 2010/0244435 A1 | * | 9/2010 | Stroope ............... F16L 37/1215 285/34 |
| 2012/0037247 A1 | | 2/2012 | Konishi |

\* cited by examiner

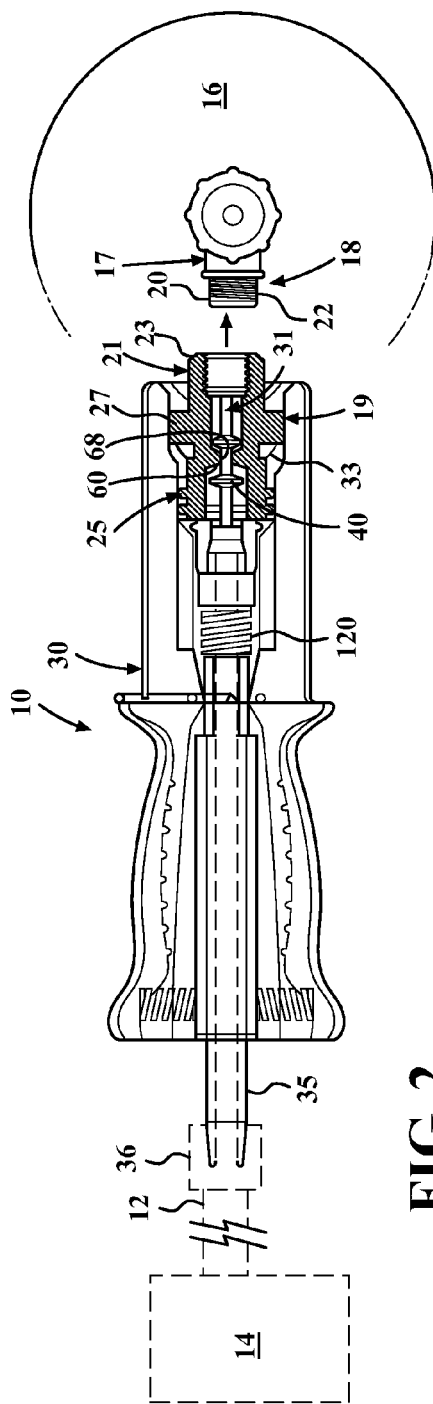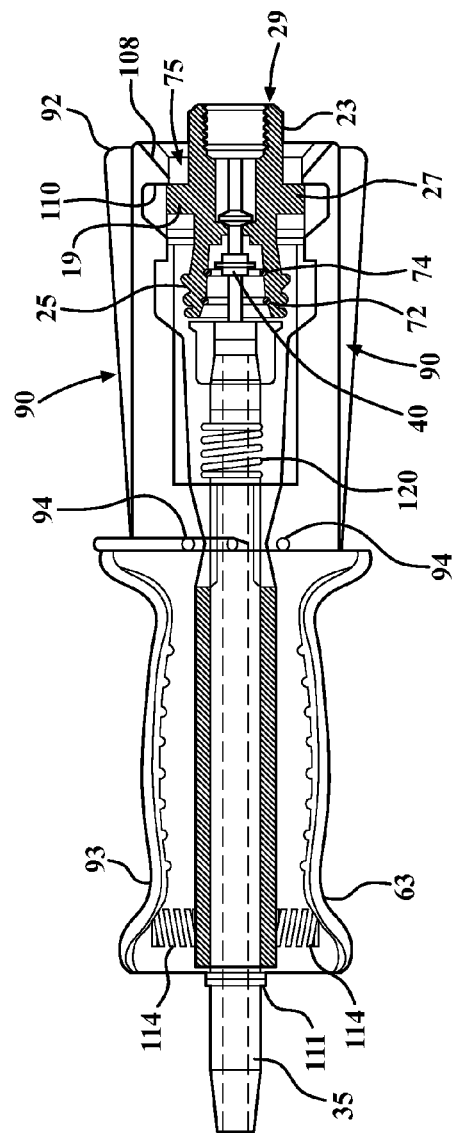

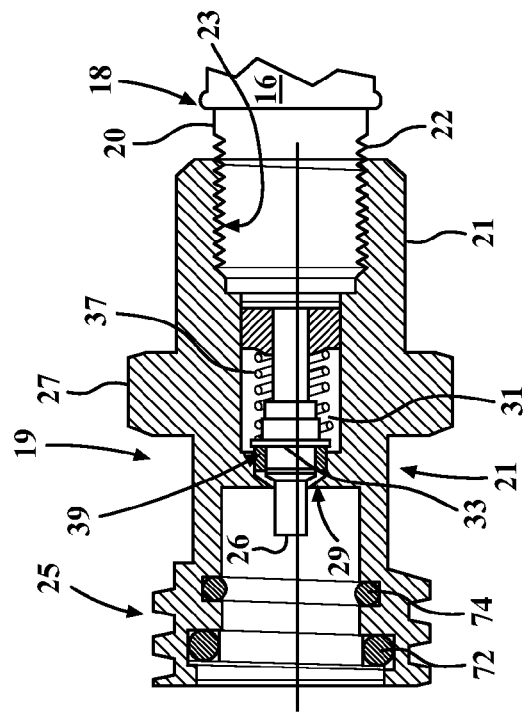
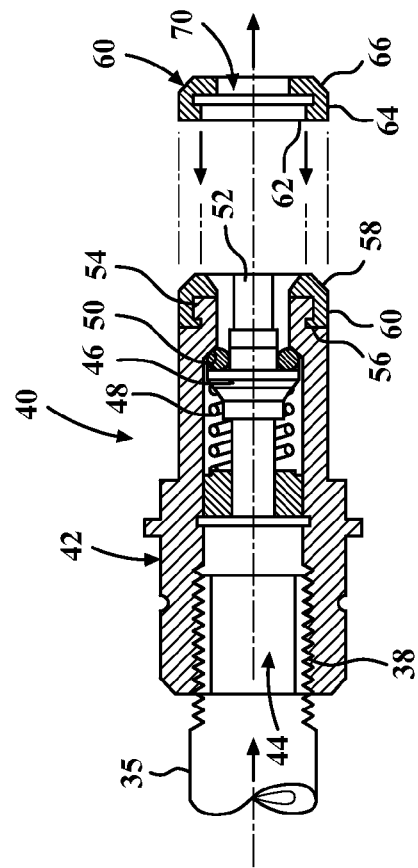
FIG. 4

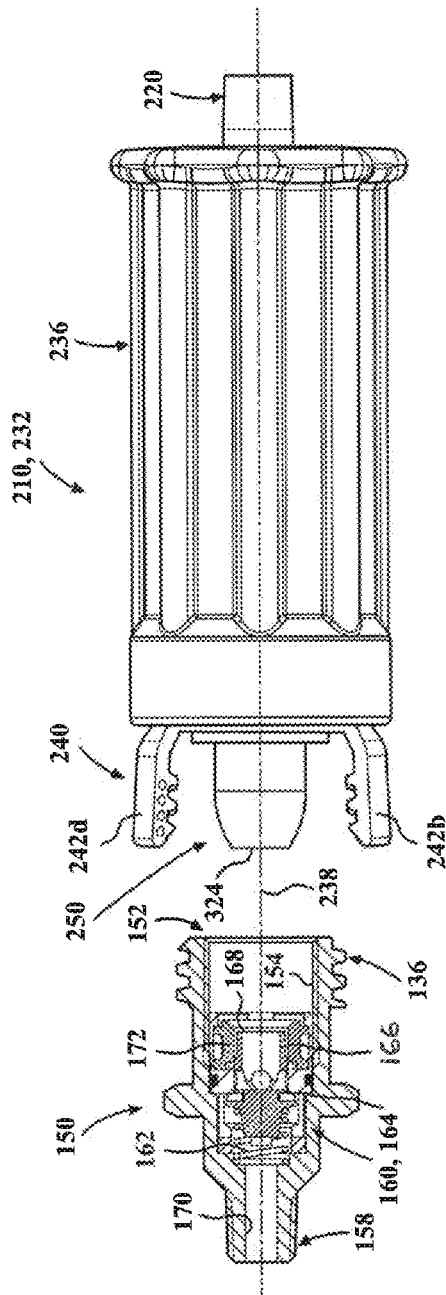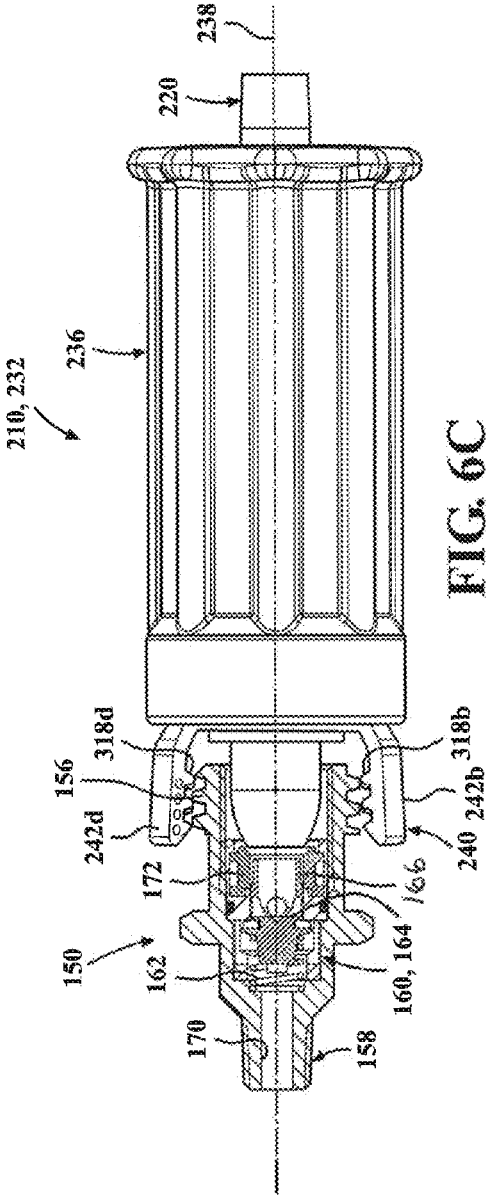

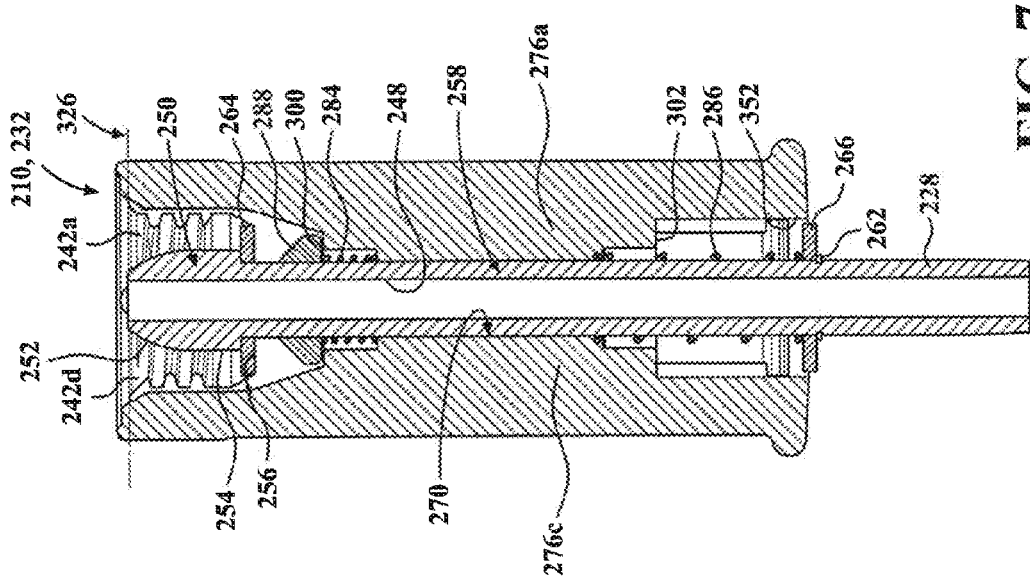
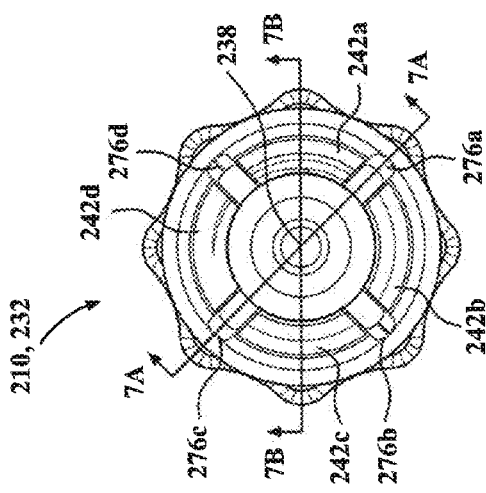

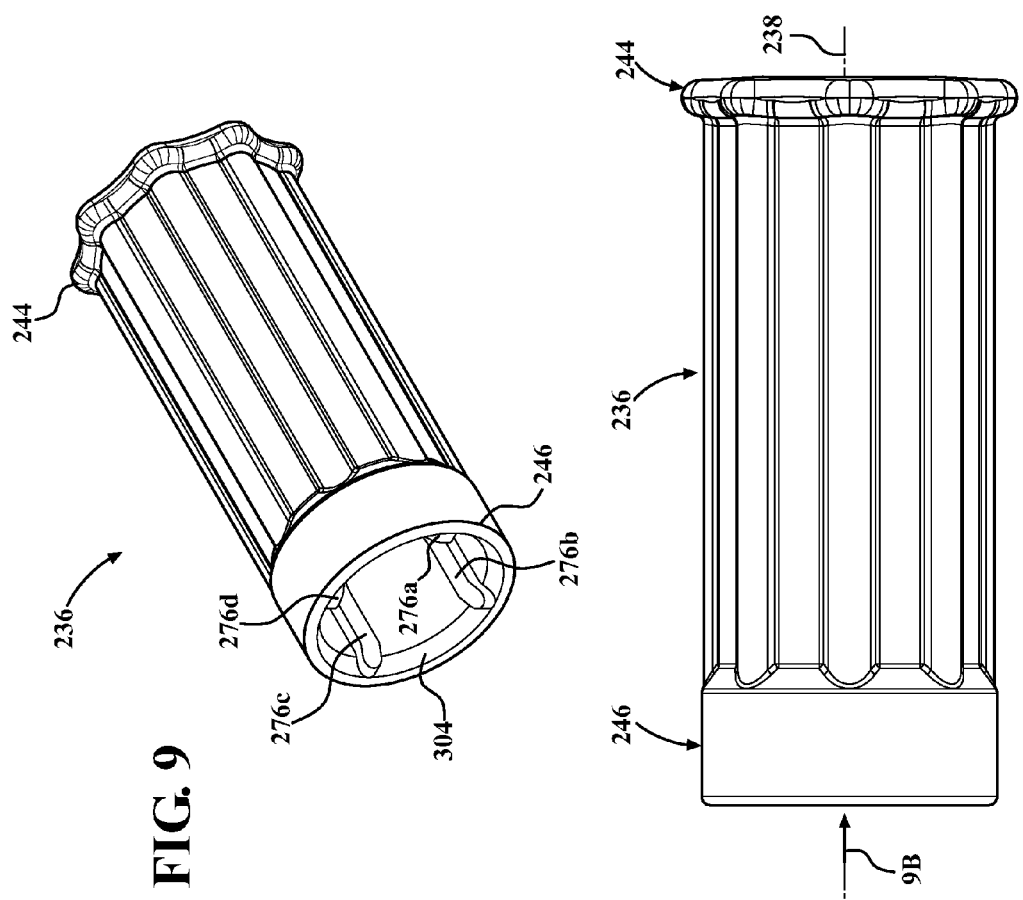

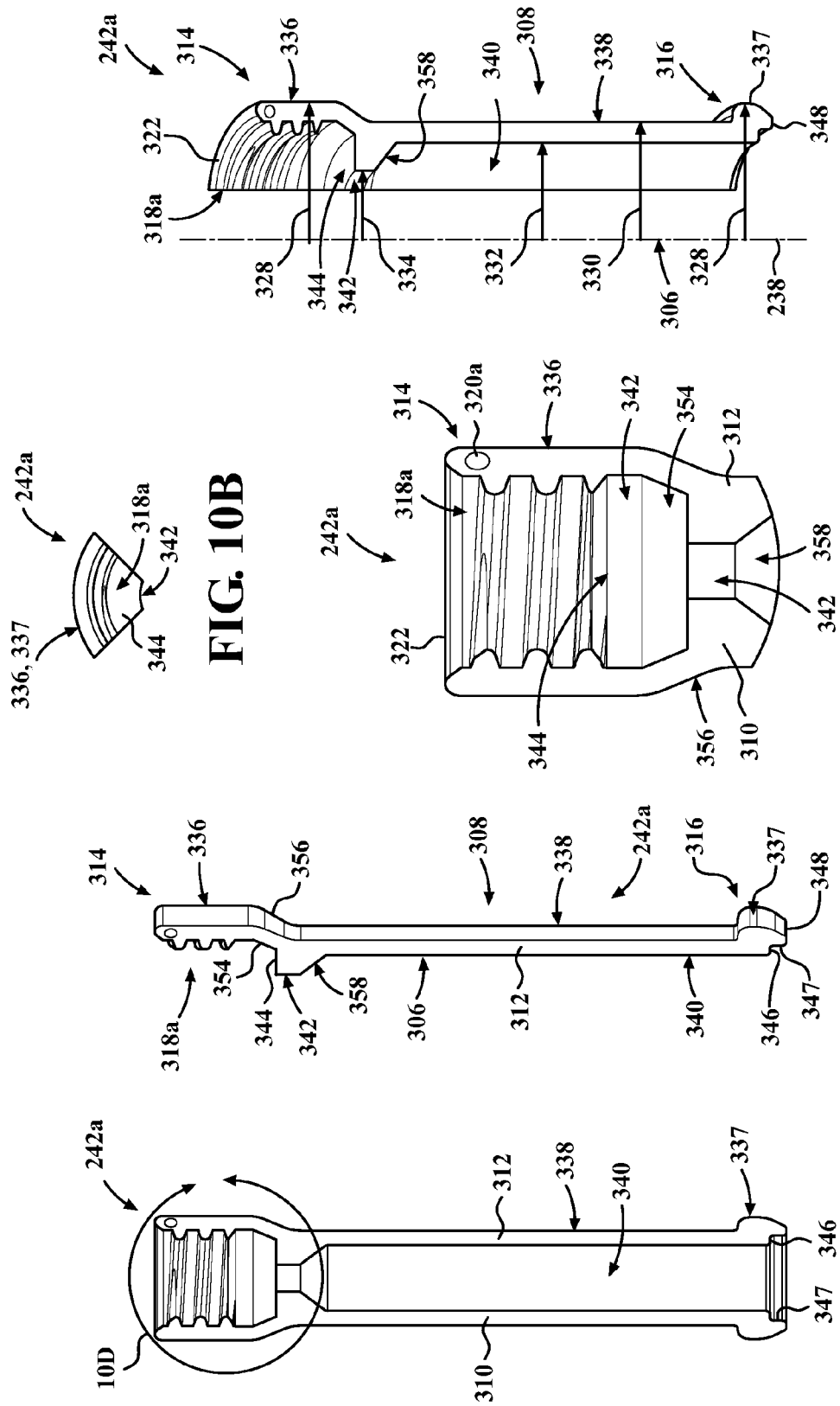

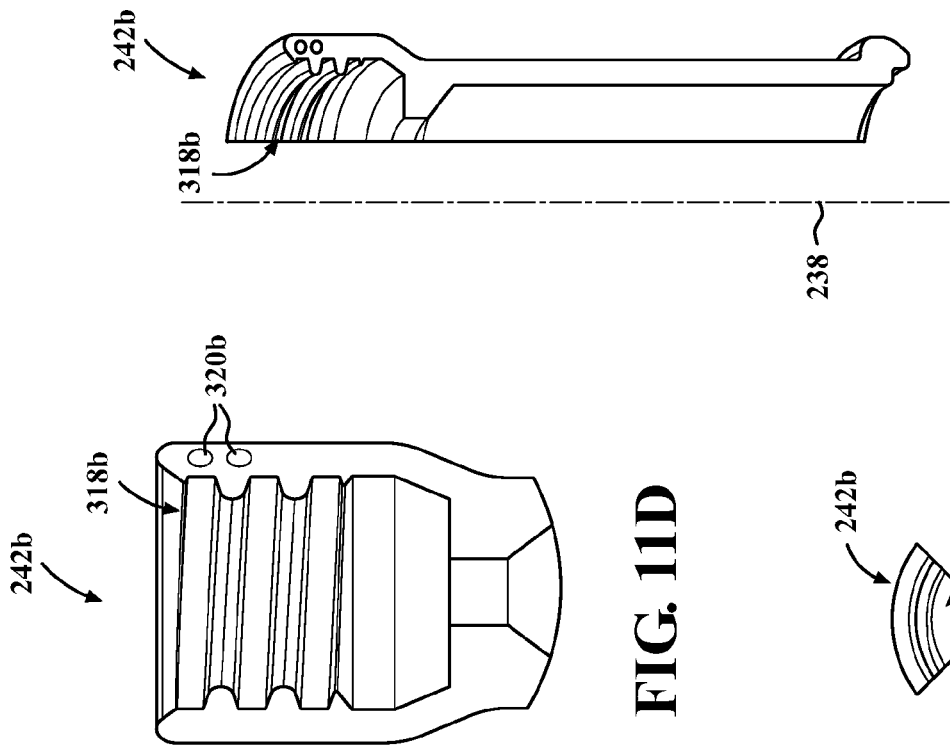
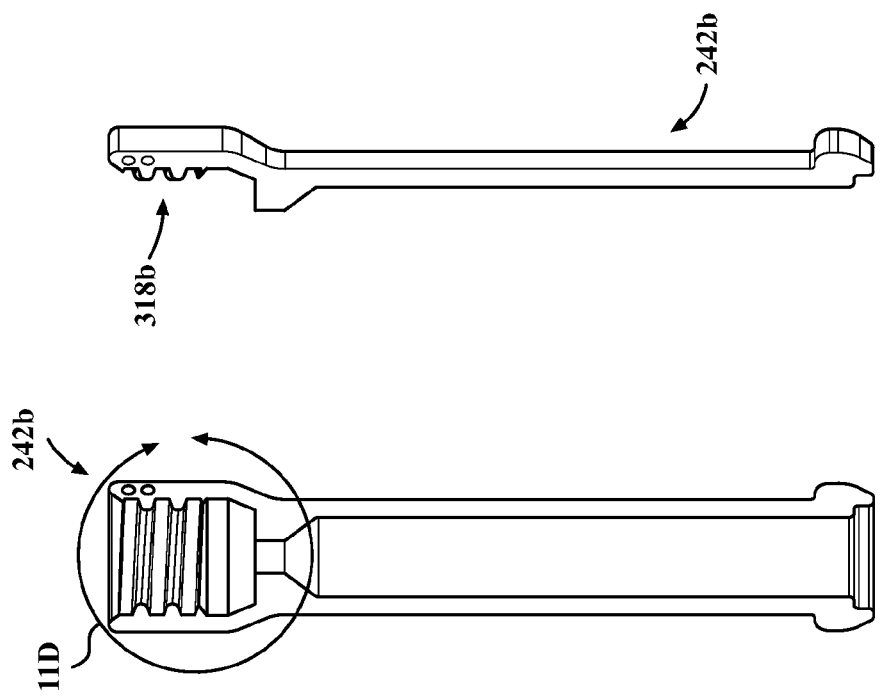

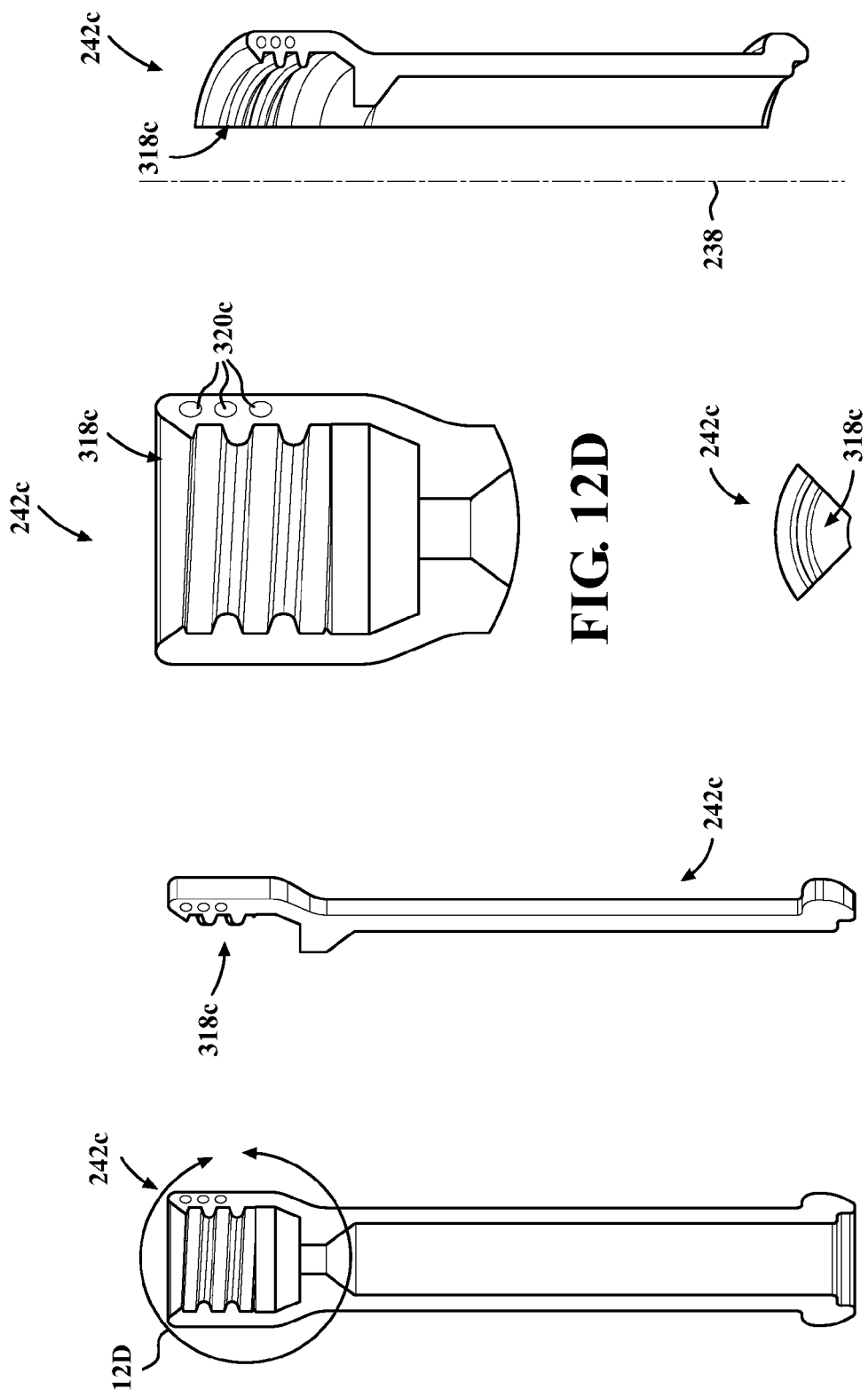

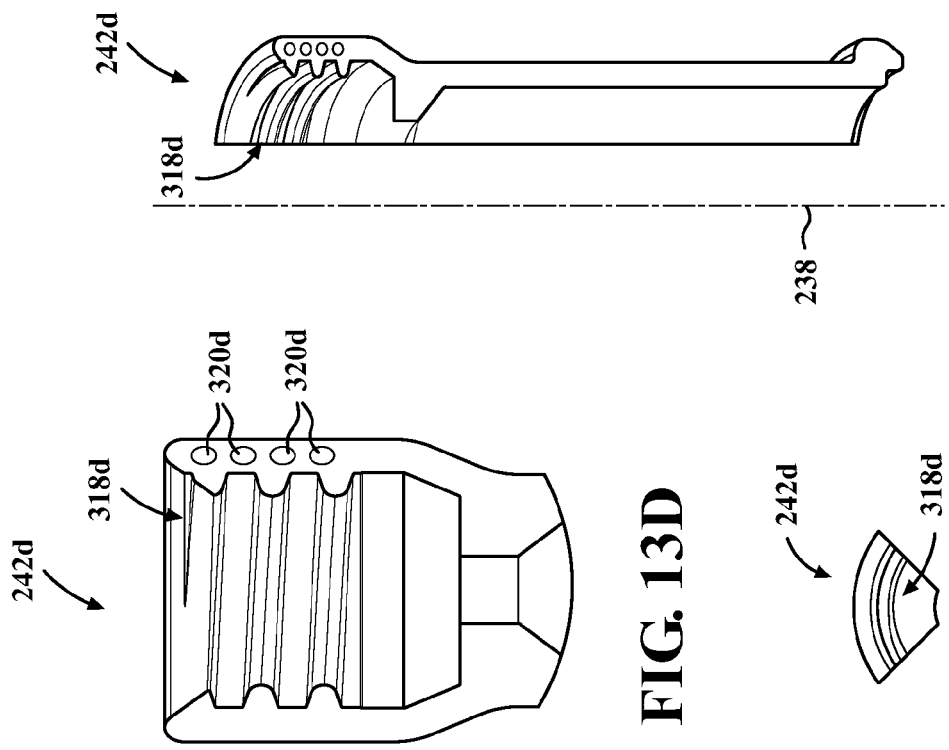
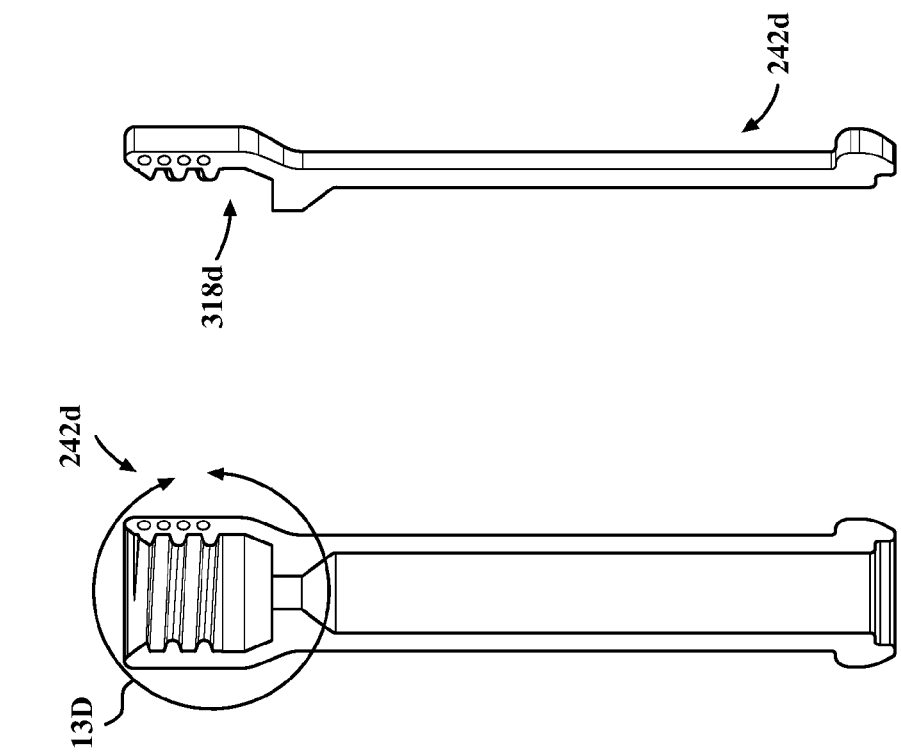

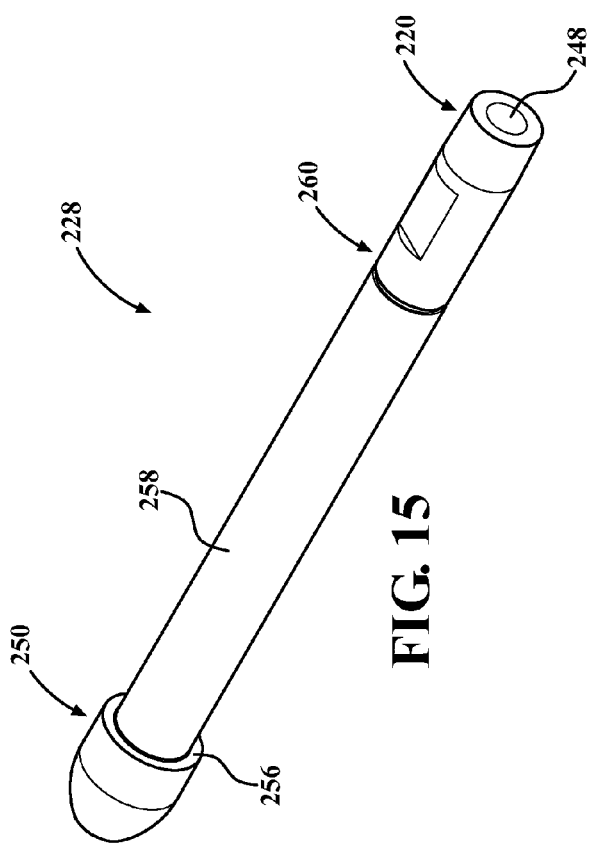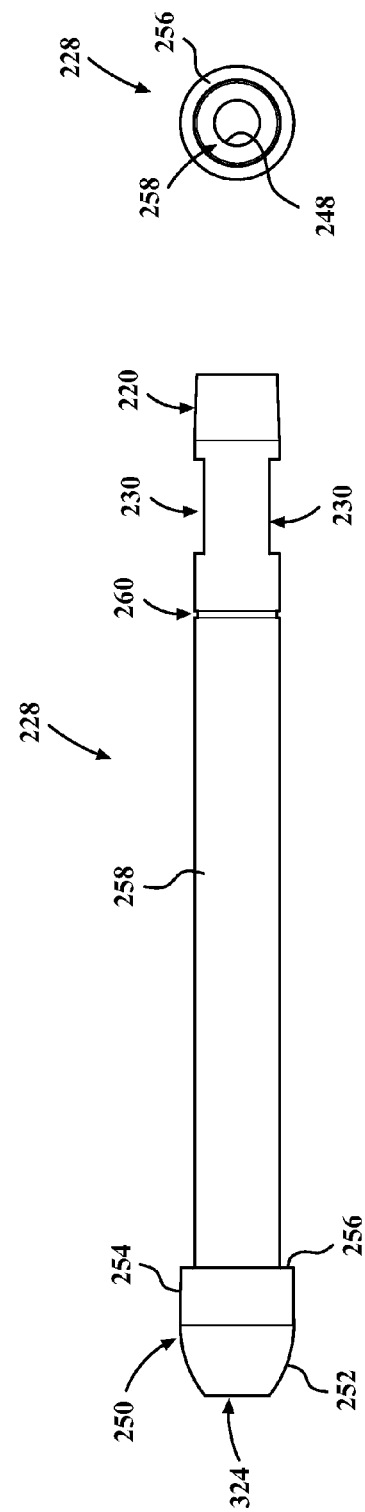

QUICK FILL FLUID CONNECTOR

CROSS-REFERENCE TO RELATED APPLICATIONS

This application is a divisional application of co-pending U.S. patent application Ser. No. 12/848,635, filed Aug. 2, 2010, which is a continuation-in-part of U.S. patent application Ser. No. 12/103,529, filed Apr. 15, 2008, now U.S. Pat. No. 7,766,039, and entitled "QUICK CONNECT FUEL HOSE CONNECTOR," the entire disclosures of which is hereby incorporated by reference.

BACKGROUND OF THE INVENTION

1. Field of the Invention

The present invention relates to a quick connect/disconnect hose connector or coupling used for transferring liquefied gas fuel from a pressurized fixed or mobile storage tank, to a fuel tank for a vehicle or an appliance, or a stationary fuel tank.

2. Description of the Related Art

A number of vehicles, such as forklift trucks, operate on propane or other LP gas, which is stored in a fuel tank on a mobile vehicle. These fuel tanks require refilling periodically, which is typically from a large fixed or mobile storage tank. In a commercial operation for filling motor fuel cylinders with LP gas or propane for forklift trucks, for example, a fuel distribution center may fill up to 3,000 fuel tanks per day. Portable LP gas fuel tanks, of the type commonly used for providing fuel for outdoor barbeque grills for example, similarly require periodic refilling from a large fixed or mobile storage tank. Large stationary LP gas fuel tanks, of the type commonly found outside rural residences that are not serviced by a natural gas utility, require periodic refilling from a mobile storage tank carried by a delivery truck.

At the present time, the most common means for filling fuel tanks or cylinders employs a screw connector wherein a threaded female coupling on a fuel hose is threaded onto a threaded male fitting mounted on the service valve of a fuel tank. Threading and unthreading a screw connector involves a great deal of time, and the repetitive action can promote operator injury, such as carpal tunnel syndrome.

Some quick connect fittings have been developed, but they have thus far been cumbersome and expensive.

An object of the present invention is to provide a quick connect fitting for connecting a fuel supply hose leading from a pressurized storage tank to a threaded fitting on a fuel tank that is simple and safe, preserves fuel, and maintains an appropriate level of sealing force over a range of operating conditions.

BRIEF SUMMARY OF THE INVENTION

The present invention provides a quick connector or coupling for connecting a fuel supply hose to a threaded inlet fitting typically provided on the liquefied gas fuel tank of a gas driven vehicle or appliance, or provided on a stationary gas fuel tank.

The present invention provides one connector embodiment that includes a generally annular body surrounding a recessed interior passage through which fuel can flow. The connector is attached to a supply hose at an inner end and is releasably connectible at an outer end to a conventional externally threaded fuel tank inlet or service fitting. An outwardly biased connection outlet valve mounted in the outer end of the quick connect fitting urges the outlet of the connector to a normally closed position. When the hose connector is attached to the fuel tank inlet, a protruding stem on the connector outlet valve engages a mating stem of an outwardly biased, normally closed inlet valve in the fuel tank inlet fitting. This causes the hose connector valve to open allowing fuel to flow from the storage tank, and the pressure of the flowing fuel opens the inlet valve to the fuel tank or cylinder. A compressible, replaceable tip seal is mounted on the nose of the connector shut off valve, providing a secure face seal between the connector and the fuel tank inlet valve.

The hose connector comprises a latch mechanism at the outer end, with the latch mechanism including pivoting latch members mounted in longitudinal slots that run lengthwise along the connector on opposite sides thereof. The latch members include inwardly extending flanges at the outer end that fit over and engage the threads and/or the nut on the inlet fitting mounted on the fuel container, creating a tight clamping fit without the need to thread the connector on the fuel tank inlet fitting. The flanges of the latch members are inwardly biased but can be released by squeezing together the outer ends or handles of the latch members opposite the flanges, causing the latch members to pivot open and release the threads of the fuel container.

The invention also includes an integrated swivel in the fuel supply connector. Also, a thrust spring maintains a consistent latch engagement force over a varying range of tank fitting sizes.

The housing of the connector fits over the tank fitting so as to guide the mating connector and tank valves into proper alignment and connection. The housing also guards against unintentional actuation of the outlet valve, which is protected within the connector housing and which self-aligns with the storage tank inlet valve. In one embodiment, proper alignment and connection are further encouraged by the length of the valve of the current invention, which may exceed the length typical of other valves in the field. In addition, the invention provides a visual indication of when the connector is engaged, as the latch members protrude from the sides of the connector body when the connector is not latched over the fuel container inlet fitting.

The present invention also provides a fluid connector having a longitudinal axis and selective open and closed conditions, the connector only in its closed condition adapted to threadedly engage a mating fluid fitting. The fluid connector includes an elongate conduit member extending along the longitudinal axis, an annular collar disposed about and having axial movement relative to the conduit member between the connector open and closed conditions, and a plurality of split nut members circumferentially distributed about the conduit member and having axial movement relative to the collar between the connector open and closed conditions. The plurality of split nut members and the collar are jointly rotatably about the longitudinal axis, and each split nut member has a distal end defining a threaded nut segment. The split nut member distal ends in the connector closed condition are constrained by the collar against radially separating movement relative to the longitudinal axis and cooperatively define a nut configured to threadedly engage a mating fluid fitting. The split nut member distal ends in the connector open condition have an expanded configuration in which, relative to the connector closed condition, they are radially separated from the longitudinal axis and not cooperatively positioned to threadedly engage a mating fluid fitting.

These and other features, objectives, and benefits of the invention will be recognized by one having ordinary skill in the art and by those who practice the invention, from this disclosure, including the specification, the claims, and the drawing figures.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a longitudinal sectional view of the quick fill connector of FIG. 1, shown in a latched condition on a threaded fuel tank connector;

FIG. 3 is a longitudinal sectional view of the quick fill connector as in FIG. 2, wherein the connector is shown in a released condition;

FIG. 4 is a longitudinal exploded sectional view of the quick fill connector of FIG. 1, showing the shut off valve and replaceable seal in position to mate with the fuel tank inlet valve;

FIG. 5A is a perspective view of the fluid valve assembly of FIG. 5, shown in its open state;

FIG. 6B is an exploded view of the open quick fill connector of FIG. 6A separated from a service valve to which it may be connected, an opposing pair of split nut members of the connector shown removed for clarity;

FIG. 6C is a view of the open quick fill connector and the service valve of FIG. 6B shown with the connector conduit member received in the service valve port, and the surrounding male threads of the service valve received in the service valve-engaging portion of the open connector;

FIG. 7 is an end view of the quick fill connector of FIG. 5 in the direction indicated by arrow 7, showing the connector in a closed condition;

FIG. 7A is a cross-sectional view of the quick fill connector of FIG. 7 along line 7A-7A;

FIG. 9 is a perspective view of the collar component of the quick fill connector of FIG. 8;

FIG. 9A is a side view of the collar of FIG. 9;

FIG. 10 is a perspective view of a first split nut member of the quick fill connector of FIG. 8;

FIG. 10A is an interior or front view of the first split nut member of FIG. 10;

FIG. 10B is an end view of the first split nut member of FIG. 10;

FIG. 10C is a side view of the first split nut member of FIG. 10;

FIG. 10D is an enlarged view of encircled area 10D of FIG. 10A;

FIG. 11 is a perspective view of a second split nut member of the quick fill connector of FIG. 8;

FIG. 11A is an interior or front view of the second split nut member of FIG. 11;

FIG. 11B is an end view of the second split nut member of FIG. 11;

FIG. 11C is a side view of the second split nut member of FIG. 11;

FIG. 11D is an enlarged view of encircled area 11D of FIG. 11A;

FIG. 12 is a perspective view of a third split nut member of the quick fill connector of FIG. 8;

FIG. 12A is an interior or front view of the third split nut member of FIG. 12;

FIG. 12B is an end view of the third split nut member of FIG. 12;

FIG. 12C is a side view of the third split nut member of FIG. 12;

FIG. 12D is an enlarged view of encircled area 12D of FIG. 12A;

FIG. 13 is a perspective view of a fourth split nut member of the quick fill connector of FIG. 8;

FIG. 13A is an interior or front view of the fourth split nut member of FIG. 13;

FIG. 13B is an end view of the fourth split nut member of FIG. 13;

FIG. 13C is a side view of the fourth split nut member of FIG. 13;

FIG. 13D is an enlarged view of encircled area 13D of FIG. 13A;

FIG. 15 is a perspective view of the fluid conduit member of the quick fill connector of FIG. 8;

FIG. 15A is a side view of the fluid conduit member of FIG. 15; and

FIG. 15B is an end view of the fluid conduit member of FIG. 15.

Figure 1:
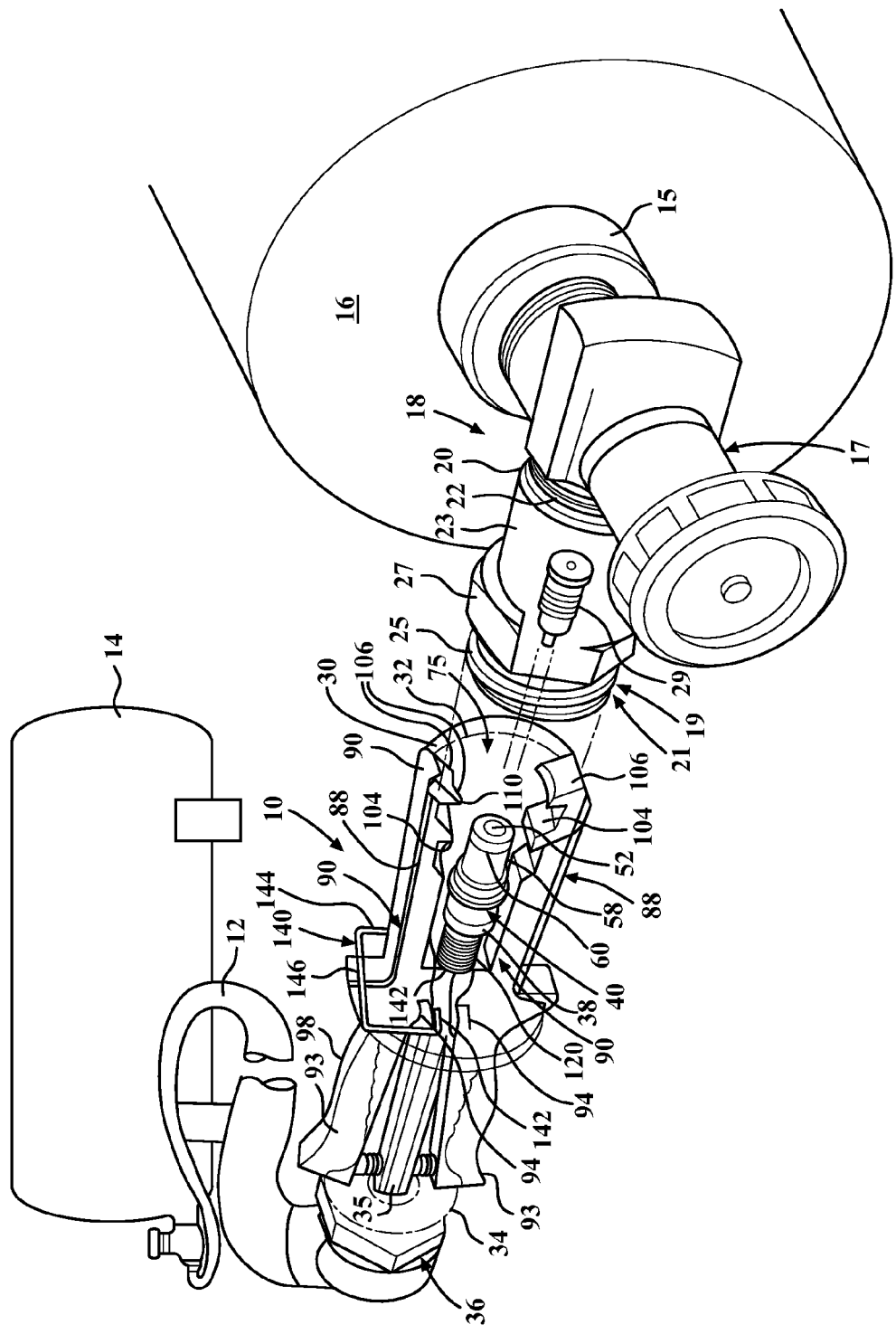
FIG. 1 is a perspective view of a quick fill connector according to a first embodiment, shown connected to a fuel supply tank and a vehicle tank and shown partially broken away to illustrate the interior components of the connector.

It is to be noted that the figures are not necessarily drawn to scale. In particular, the scale of some of the elements of the figures may be exaggerated to emphasize characteristics of the elements. It is also noted that the figures are not necessarily drawn to the same scale. Elements shown in more than one figure that may be similarly configured have been indicated using the same reference numerals.

While the invention is susceptible to various modifications and alternative forms, specific embodiments thereof are shown by way of example in the drawings and may herein be described in detail. It should be understood, however, that the drawings and detailed description thereto are not intended to limit the invention to the particular form(s) disclosed, but on the contrary, the intention is to cover all modifications, equivalents and alternatives falling within the spirit and scope of the present invention as defined by the appended claims.

DETAILED DESCRIPTION OF THE EXEMPLARY EMBODIMENT(S)

In accordance with the present invention, a connector 10 is shown in FIG. 1 attached to a fuel supply hose 12 that is attached in turn to a fuel storage tank 14. The fuel storage tank can be a fixed tank as shown, or it can be a mobile fuel supply tank mounted on a truck or the like. The fuel supplied by the tank is propane or other LP gas, which is a gas at atmospheric pressure but which is a liquid when maintained in a pressurized storage container.

Connector 10 shown in FIGS. 1-4 is particularly adapted to the transfer of pressurized LP gas to mobile fuel tanks of the type used on forklift trucks or the like, but can be applied also to the pressurized transfer of anhydrous ammonia, although stainless steel components are necessary for use with anhydrous ammonia. For exemplary purposes, the connector embodiment shown in FIGS. 1-4 is described in connection with a fuel transfer operation wherein a stationary or portable LP gas tank or a vehicle such as a forklift truck is supplied with LP gas from a storage tank.

Herein, the tank 16 to which is fixed the valve releasably engageable by an inventive connector embodiment is referred to as the "fuel tank," and the tank 14 brought into fluid communication with the fuel tank 16 through hose 12 is referred to as the "storage tank." Fuel tank 16 has a service valve 17 having an inlet 18 comprising an annular collar 20 having a threaded outer surface 22 employing a pipe thread. The service valve 17 screws into an internally threaded collar 15 on the tank inlet.

An inlet valve or adapter fitting 19 (which is usually referred to as an "outlet" valve because the service valve 17 delivers fuel to a vehicle or appliance) is screwed onto the service valve inlet 18. Inlet valve 19 includes an annular body 21 having an internally threaded outlet 23 at one end and an externally threaded inlet 25 at an opposite end. Outlet 23 is adapted to be screwed onto the externally threaded inlet 18 of service valve 17. A radially extending flange 27 having flat sides serves as a nut for bolting the adapter fitting 19 to inlet 18. Externally threaded inlet 25 is provided with acme threads or other conventional threads that are used to attach a conventional fuel delivery hose connector to the tank. In the usual case of LP gas fuel tanks 16 for powering vehicles, inlet 25 has a 1¼ inch male acme thread.

Connector 10 is designed to be used in connection with a conventional vehicle LP gas tank or canister 16 of conventional design. Such fuel tanks 16 include an outwardly biased, normally closed valve 29 is mounted in the open interior 31 of inlet valve body 21. Valve 29 includes moveable valve member 33 biased by spring 37 toward a valve seat 39 positioned outwardly from valve member 33. A projection 26 extends from an end of the valve member through valve seat 39.

Hose connector 10 comprises an elongated, generally annular body or collar 30 formed of synthetic resin or the like, and having an outer or distal end 32 and an inner or proximal end 34. A fuel delivery tube or fluid conduit member 35 extends through the collar between the inner and outer ends. As used herein, the terms "outer" or "distal" will generally refer to the direction of fuel flow away from the storage tank 14 and toward the fuel tank 16. Similarly, herein the terms "upstream" and "downstream" are relative to the general direction of fuel flow from the storage tank 14, through hose 12, and towards fuel tank 16, with proximal locations being upstream of corresponding distal locations.

The inner end of tube 35 is attached to a swivel connection 36 that connects to the outer end of fuel supply hose 12. The swivel connection permits body 30 to be rotated with respect to the fuel hose. The outer end of fuel delivery tube 35 is threaded and is screwed into engagement with an internally threaded inlet opening 38 in a connector outlet valve 40.

Connector outlet valve 40 includes an annular body 42 having an open interior 44 extending through the body and having a valve member 46 moveably mounted in the open interior. Valve member 46 is spring biased by a spring 48 outwardly to a closed position against a valve seat 50 positioned outwardly from the valve member. A projection 52 extending from valve member 46 extends through valve seat 50 to the outer side thereof. The annular outlet valve body 42 also extends beyond valve seat 50 to form a collar 54 on the outer side of the valve seat. Collar 54 has a peripheral groove 56 adjacent the outer end or nose 58 thereof. A resilient compressible seal 60 fits on the end of nose 58 (shown mounted and separate in FIG. 4). An inwardly projecting peripheral flange 62 on a skirt 64 of the seal fits in groove 56 and resiliently holds the seal on the end of nose 58. The seal has a beveled outer surface 66 that mates with a valve seat 68 in the interior of adapter fitting 19. Seal 60 has an interior opening 70 therethrough that permits LP gas to flow through the seal into the interior of fuel delivery tube 35 when seal 60 is nested against valve seat 68 of adapter valve 19. The nose seal thus provides an additional seal, over and above interior o-ring seals 72 and 74 that are conventionally mounted in the interior opening of adapter 19. In the exemplary embodiment, the seal is formed of a Teflon impregnated carboxulated nitrile material. Other materials can be used.

The nose seal permits a face seal between opposing valve elements and provides substantial additional protection against fuel leakage.

While the nose seal feature is described in connection with the quick connect outlet valve of the present invention, the same nose seal feature can advantageously be employed with other LP fuel connectors. For example, the nose seal can be employed with a threaded fuel hose delivery outlet, and it can be employed in a fuel line connector between the carburetion fuel line and the service valve on a motor fuel type application.

Hose connector 10 provides a means for connecting a connector outlet valve to the adapter fitting of the vehicle fuel tank without having to screw the two components together with conventional threaded fittings, while still insuring a tight seal. Connector body 30 has a recessed interior opening 75 extending inwardly from an open outer end thereof. Tube 35 and attached connector outlet valve 40 are mounted in the interior opening, and the adapter 19 and adapter valve 29 fit inside this opening in order to mate with connector outlet valve 40. The tubular body of the connector guides these two valves into engagement with each other and insures that they are properly aligned, while protecting the valves from damage.

Body or collar 30 includes opposing slots 88 on opposite sides of the body, and latch members 90 are pivotally mounted in the slots 88 by pivot pins 94 that extend transversely through intermediate positions 96 on the latch members 90. Latch members 90 have outer and inner ends 92 and 93, with outer end 92 extending from the pivot pin 94 toward the outer end 32 of the connector body 30, and inner end 93 extending from the pivot pin 94 toward the inner end 34 of the connector body. Latch members 90 have outer surfaces 98. The outer ends 92 of latch members 90 have inwardly extending flanges 104 and 106, with the flanges having downwardly and inwardly inclined outer surfaces 108 and generally perpendicular inner surfaces 110. Flanges 104 fit over radially outwardly extending nut flange 27 on the fuel container adapter fitting 19. Flanges 106 on the latch members fit over acme threads 25 on the end of the fuel tank adapter fitting.

Springs 114 extend between ends 93 of the latch members 90 and the tube 35 near the inner end 34 of the connector body. Pressing together the latch handles formed by ends 93 causes springs 114 to compress and causes the opposite ends 92 in flange elements 104 and 106 to pivot outwardly, releasing the latch. Releasing ends or handles 93 permits springs 114 to expand, forcing ends 93 to pivot outwardly and causing the latch members at ends 92 to pivot inwardly, so as to latch the fuel connector on the fuel tank inlet after the connector valve and fuel tank inlet valves have been connected together.

In order to provide a secure latching action and compensate for some differences in valve sizes, the connector outlet valve is resiliently movable with respect to the latch members. Tube 35 and the attached outlet valve are slidable longitudinally in the handle. A spring clip 111 limits forward or outward movement of the tube. The attached outlet valve restricts inward movement of the tube. A compression or thrust spring 120 is positioned on the tube between the connector outlet valve and the base of the opening in the outer end of the connector handle. When the connector is fitted on a tank inlet, the connector outlet valve and the tank inlet valve mate, so that both valves open. In order to secure a firm mating engagement of the valves, it is necessary that the connector body be firmly engaged with the vehicle tank inlet. To provide for a secure, resilient connection when the valves engage, spring 120 permits the connector outlet valve to yield resiliently until the valves are securely seated. When the latch members close, spring 120 urges the engaged valves outwardly into latching position with the closed latch members. Spring 120 ensures that the two valves remain seated together with sufficient spring pressure to maintain a sealed contact between themselves and the latch members.

Another feature of the embodiment shown in FIGS. 1-4 is the incorporation of a hanging bracket 140 on the body of the connector. Hanging bracket 140 can be a U-shaped member formed of wire rod or the like that is attached at inwardly extending ends 142 at the ends of legs 144 of the member. A back portion 146 extending between the legs can be attached to a support member, such as a strap or the like attached to a support structure, so as to suspend the connector at a desired elevation above the ground. This makes it possible to pivot the connector into engagement with a fuel tank inlet at a particular repeated elevation, without having to lift the connector up to that elevation each time a vehicle tank is filled. This can speed the filling operation when the connector is used to repeatedly fill tanks having inlets at the same elevation.

The body or collar of the connector can be formed of any desirable material and preferably is formed of a synthetic resin having insulating properties that prevent the operator's hand from becoming too cold. The shape of the handle can be designed for operator comfort, and flanges can be placed on the outer and inner ends in order to prevent an operator's hand from sliding inwardly or outwardly off the handle. The gripping surface of the handle can have a textured finish so as to improve gripping characteristics.

Figure 5:
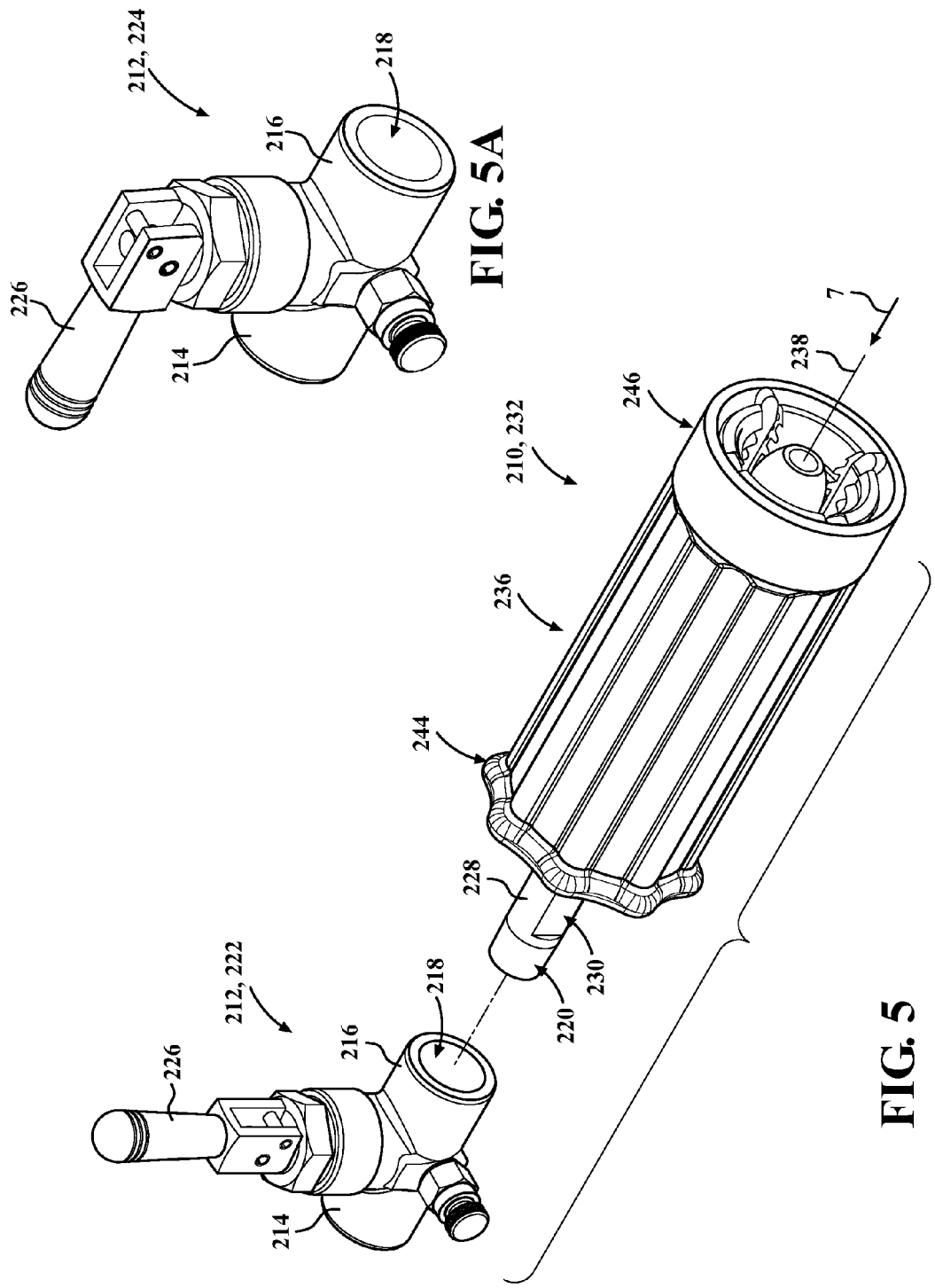
FIG. 5 is an exploded view of a quick fill connector according to a second embodiment and a known exemplary fluid valve assembly to which it may be attached, the fluid valve shown in its closed state.

Referring to FIG. 5, there is shown hose connector or coupling assembly 210 which is adapted for being threadedly connected to shut-off valve assembly 212. The connector embodiment shown in FIGS. 5-14 is particularly adapted to the transfer of pressurized LP gas to portable fuel tanks 16 having a fuel capacity of forty pounds or less and of the type used for appliances such as, for example, barbeque grills. Valve assembly 212 is preferably a quick acting shut-off valve, such as the model ME791C or ME792C toggle valve commercially available from Marshall Excelsior Company, the assignee of the present application. The inlet end 214 and outlet end 216 of valve assembly 212 are each provided with a ¼ inch NPT internal pipe thread. Valve inlet end 214 is secured to the outlet end of fuel supply hose 12 which leads from fuel storage tank 14, directly or through a swivel connection similar to connection 36 described above. Valve outlet end 216 is threadedly engaged with externally threaded portion 220 of hose coupling assembly 210 via a ¼ inch NPT joint. All threaded connections between hose 12 and connector 210 may use a suitable pipe thread sealing compound. Externally threaded portion 220 defines the proximal end of connector 210 and its tubular fluid conduit member or fuel delivery tube 228.

FIG. 5 shows shut-off valve assembly 212 in its closed state 222; FIG. 5A shows valve 212 in its open state 224. In closed state 222, handle 226 of toggle valve assembly 212 extends outwardly from the valve body, and in the open state 224, handle 226 extends generally along the valve body and backwardly towards hose 12 and away from valve outlet end 216. Valve 212 may be quickly moved between its open and closed states by pivoting movement of handle 226 relative to the valve body.

Fluid conduit member 228 of hose connector 210 is machined from 303 stainless steel tubing, and is provided with diametrically opposed flats 230 located near and downstream of externally threaded conduit portion 220. An open-ended or crescent wrench may be used to grasp and torque conduit member 228 relative to valve 212 by engaging the opposed flats 230, for securing the threaded connection therebetween.

Figure 6:
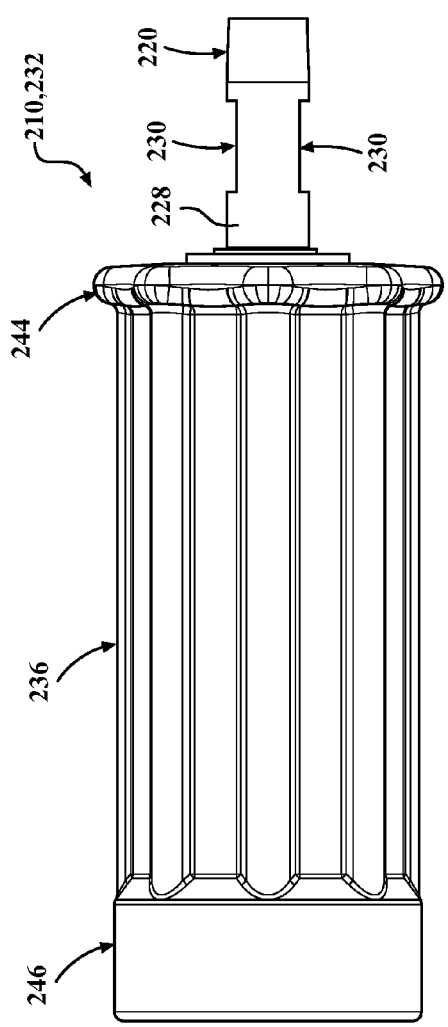
FIG. 6 is a side view of the quick fill connector of FIG. 5, showing it in a closed condition.
Figure 6A:
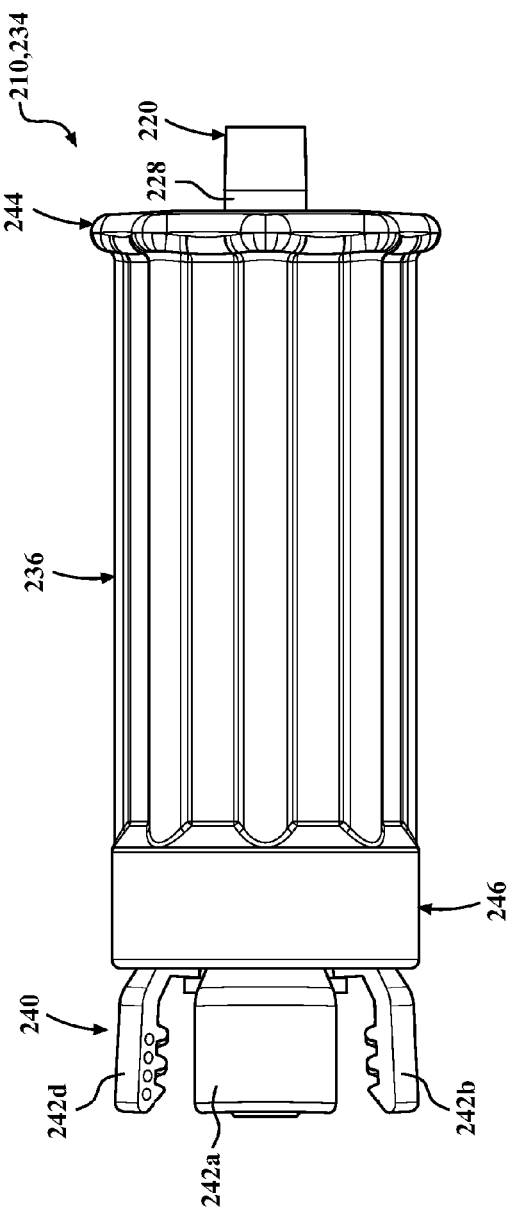
FIG. 6A is a side view of the quick fill connector of FIG. 5, showing it in an open condition.

Connector assembly 210 has a closed condition 232, shown in FIGS. 5 and 6, and an open condition 234, shown in FIGS. 6A-6C. Movement of connector 210 between its closed and open conditions 232, 234 is accomplished through the axial movement of its elongate annular connector body or collar 236 relative to coaxial fluid conduit member 228 along longitudinal axis 238. Connector 210 is provided with a service valve-engaging portion 240 located at its distal end, that is retracted into and radially contained within the distal end of collar 236 in the closed condition 232, and is extended from the distal end of collar 236 in the open condition 234. In the open condition, the distal, internally threaded portions of a plurality of split nut members 242 circumferentially arranged about the distal end of conduit member 228 are radially displaced away from axis 238, allowing the service valve 150 connected to fuel tank 16, to which connector 210 is selectively coupled, to be axially received into and removed from portion 240 quickly and without relative rotation other than a partial rotation for sealingly the fluid joint between the service valve 150 (FIGS. 6B and 6C) and conduit member 228 during connection. For the purposes of clarity, in FIGS. 6B and 6C service valve-engaging portion 240 of connector 210 is shown with only two opposing split nut members 242: 242*b* and 242*d*. Split nut members 242*a* and 242*d* are omitted in this view to show enlarged distal end 250 of conduit member 228.

Referring to FIGS. 6B and 6C, service valve (or adapter fitting) 150 is of the conventional type found on portable LP gas tanks or canisters weighing forty pounds or less full, the inlet 152 of which has a port 154 surrounded by a 1 5/16 inch male acme thread 156. Service valve 150 has a male NPT end 158 threadedly engaged with the mating female pipe thread of a manually actuated service valve 17 mounted to a fuel tank 16, as is well-known in the art and described above and shown in FIG. 1. In other words, service valve 150 is threadedly connected to the upstream side of service valve 17, the downstream side of which is secured to the inlet of fuel tank 16. Service valve 150 is provided with an internal check valve mechanism 160 biased by a compression spring 162 toward its service valve inlet port 154, and into the closed state 164 shown in FIGS. 6B and 6C.

Check valve mechanism 160 has an elongate hollow body 166 that moves axially between the closed and open states. In the manner known to those of ordinary skill in the art, body 166 is moved axially from the closed state 164 by its terminal end 168 being abuttingly engaged and depressed against the biasing force of spring 162, which moves body 166 off of its seat, placing the hollow interior of the body in fluid communication with bore 170 that extends through threaded end 158 of service valve 150, and to service valve 17 attached to fuel tank 16. The check valve body terminal end 168 is abutted by and displaced by the terminal end 324 of connector conduit member 228 when connector 210 is fully, sealably engaged with service valve 150, as described further below.

Connector assembly 210 is normally biased into its closed condition 232 under the net force of a pair of springs internal to collar 236, as described further below. With connector 210 in its closed condition 232 and disconnected from the service valve, shut-off valve 212 (preferably in its closed state 222 with its handle 226 outwardly extended) may be held in one of the operator's hands. Collar 236 is grasped by the other hand and moved toward valve 212 along axis 238, thereby extending connector portion 240 from the distal end of collar 236 and radially displacing the internally threaded distal ends of split nut members 242 away from fluid conduit member 228. Thus the connector 210 is moved into its open condition 234. The body or collar 236 of the connector 210 can be formed of any desirable material and preferably is formed of a synthetic resin having insulating properties that prevent the operator's hand from becoming too cold. For example, collar 236 may be injection molded from a material such as Capron™, a 30% glass-filled nylon.

As the connector assembly 210 is placed onto the service valve 150, with the service valve-engaging portion 240 in an expanded configuration, conduit distal end 250 is received into inlet port 154 and its tip 324 brought adjacent to but preferably not in contact with valve body terminal end 168. The convexly-surfaced portion 252 of conduit member distal end 250 is configured to cooperate with the interfacing end surface of resilient seal 172 that surrounds check valve body 166. Seal 172 may be a Teflon impregnated carboxulated nitrile material, although other materials can be used.

In other words, during coupling of connector 210 and service valve 150, with connector 210 in the open condition 234, the distal end 250 of fluid conduit member 228 is inserted into service valve inlet port 154, and the male acme thread 156 of the service valve 150 is surrounded by the distal ends of the circumferentially arranged plurality of split nut members 242 which, re in their expanded configuration are radially displaced away from axis 238 and service valve male thread 156.

The collar 236 is then moved, or released and allowed to move under the bias of the springs, axially away from shut-off valve 212 along conduit member 228, thereby causing the connector portion 240 to move towards its closed condition 232 in which the internal acme thread forms of the split nut members 242 encircling the service valve inlet 152 are moved into untightened threaded engagement with the external acme thread 156 of the service valve, and connector portion 240 is retracted into the distal end of collar 236.

The operator then rotates collar 236 of the untightened connector 210 clockwise about ⅛ turn to tighten the threaded acme joint, which drives the closed connector 210 in the downstream direction relative to service valve 150. The distal end of fluid conduit member 228 seals against and compresses seal 172 and abuts and depresses the terminal end 168 of valve body 166, thereby moving check valve mechanism 160 into its open state. As can be readily understood from the drawings, rotation of collar 236 onto service valve 150 causes rotation of split nut members 242 about axis 238. A tightening rotation of the acme threads defined by split nut members 242 onto service valve thread 156 forces the distal end of conduit member 228 further into service valve inlet port 154 and forms a fluid joint between the fluid conduit and the hollow interior of check valve body 166 that is sealed by seal 172. Further tightening rotation of connector 210 onto service valve 150 moves check valve mechanism 160 into its open state. Notably, collar 236 and split nut members 242 may be rotated relative to conduit member 228, shut-off valve 212, and hose 12. Once the connector 210 is fully seated onto service valve 150, service valve 17 is then manually opened, thereby bringing conduit member 228 into fluid communication with the interior of fuel tank 16; and shut-off valve 212 is moved into its open state 224, thereby bringing conduit member 228 into fluid communication with the interior of storage tank 14; thus allowing pressurized fluid to flow from storage tank 14 to fuel tank 16.

After filling of fuel tank 16 is completed, and preferably only after service valve 17 has been closed and shut-off valve 212 has been placed in its closed state 222 (FIG. 5), to prevent undesired fluid flow from either after disconnection, connector 210 is quickly disconnected from service valve 150 by the operator pulling collar 236 away from service valve 150 along axis 238. This action moves connector 210 into its open condition 234 in which the connector's service-valve engaging portion 240 is extended from the distal end of collar 236 and the internally threaded ends of split male members 242 have been moved into their expanded configuration (FIGS. 6A-6C) in which they are radially displaced away from fluid conduit member 228 and axis 238, and are thus disengaged from male acme thread 156 of service valve 150. Thus connector 210 quickly disengages service valve 150 and may be separated therefrom without relative rotation therebetween.

Figure 7C:
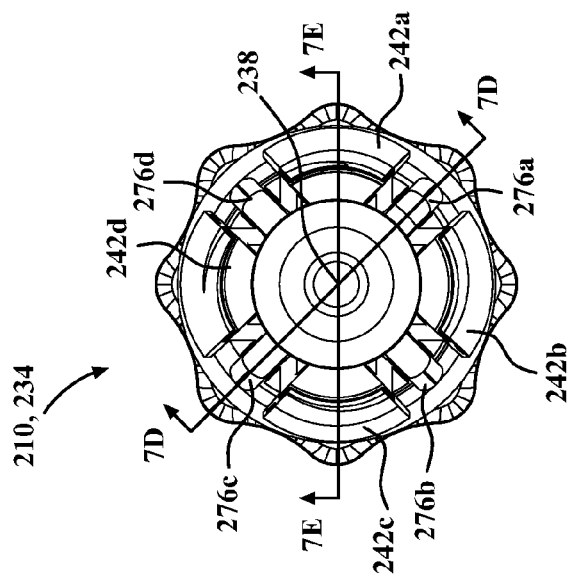
FIG. 7C is an end view of the quick fill connector of FIG. 5 in the direction indicated by arrow 7, showing the connector in an open condition.
Figure 7B:
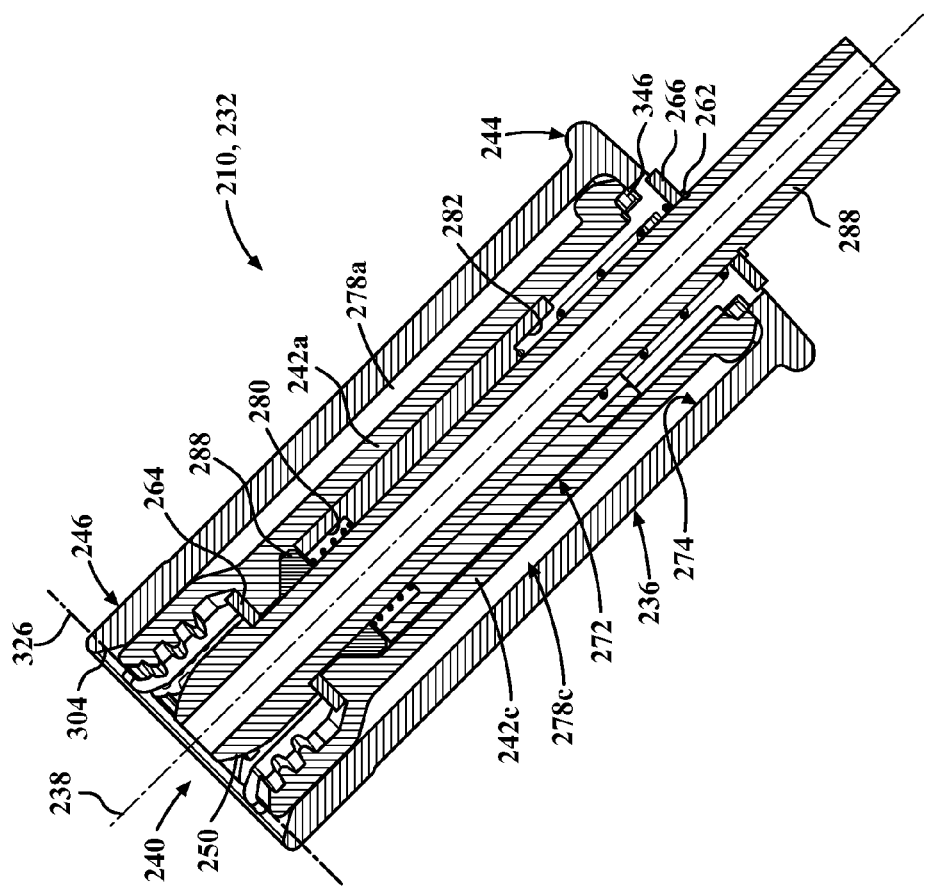
FIG. 7B is a cross-sectional view of the quick fill connector of FIG. 7 along line 7B-7B.
Figure 7E:
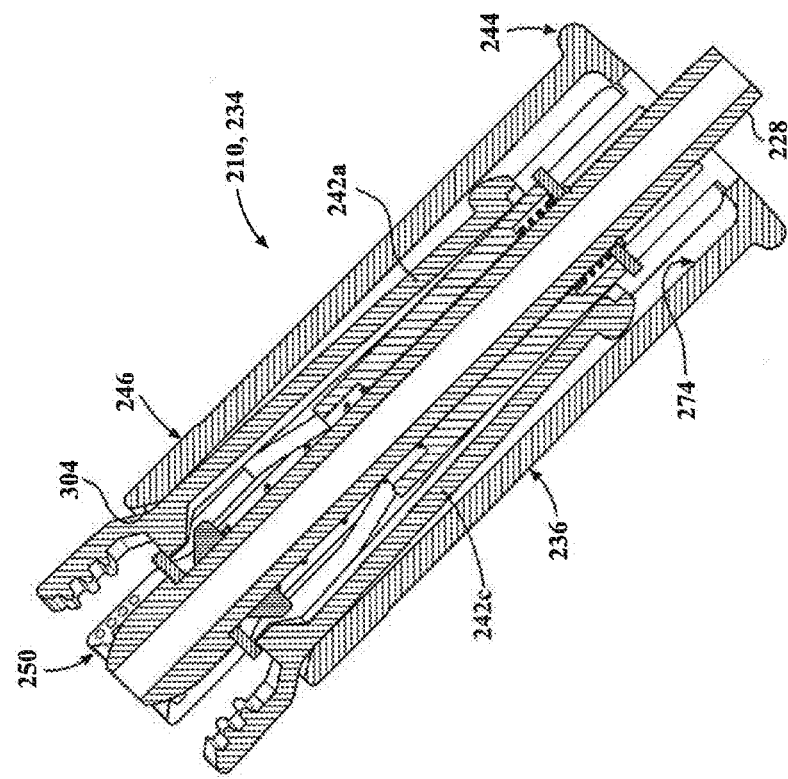
FIG. 7E is a cross-sectional view of the quick fill connector of FIG. 7C along line 7E-7E.
Figure 7D:
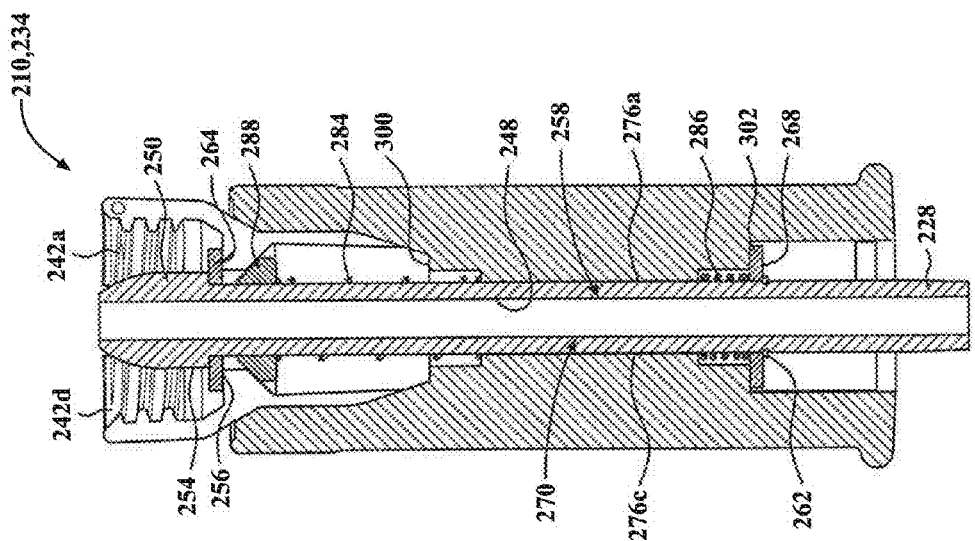
FIG. 7D is a cross-sectional view of the quick fill connector of FIG. 7C along line 7D-7D.
Figure 8:
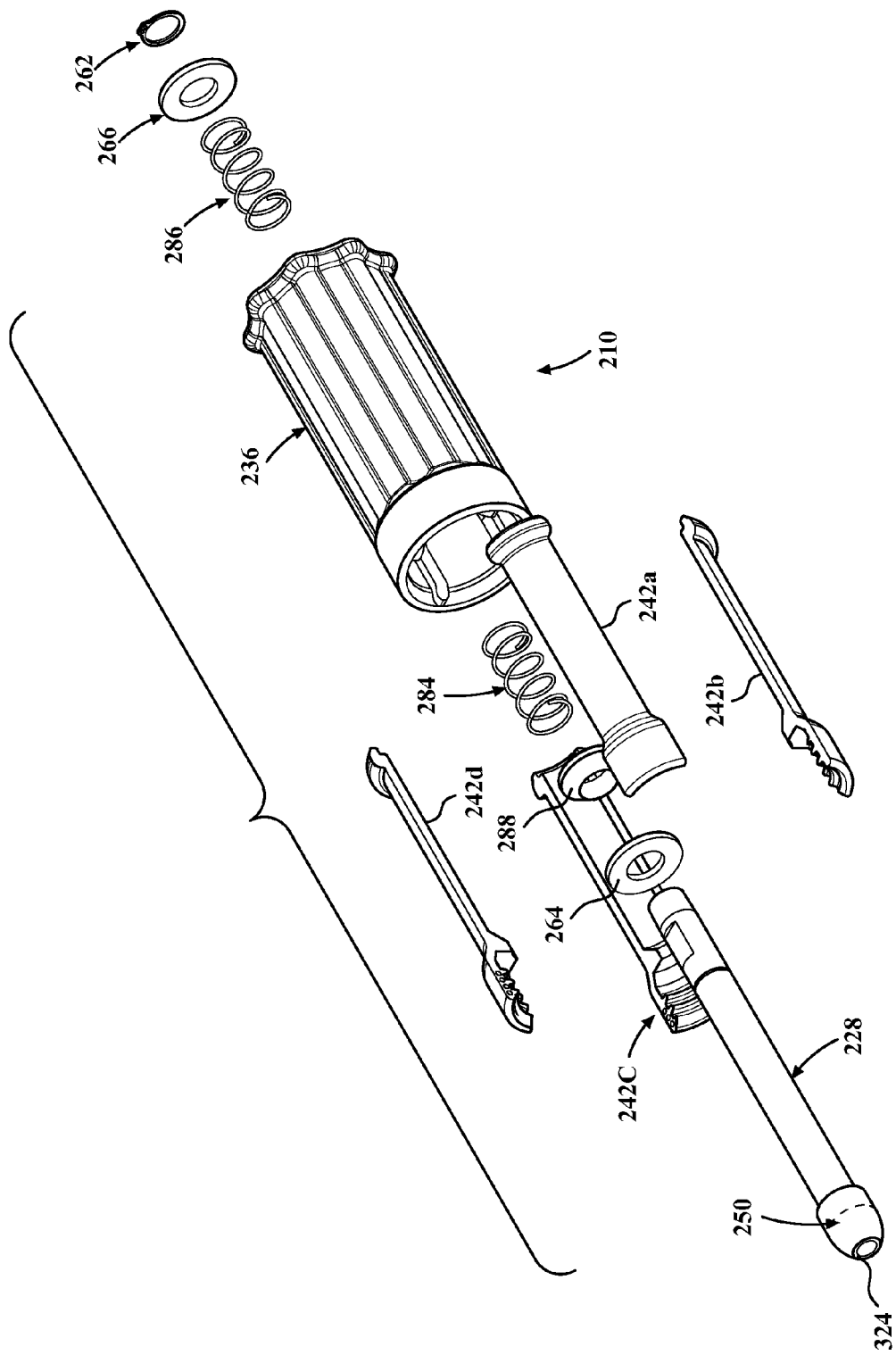
FIG. 8 is an exploded view of the quick fill connector of FIG. 5, showing component parts thereof.

Referring to FIGS. 7-7E and 8, it can be seen that the plurality of split nut members 242 includes first split nut member 242a, second split nut member 242b, third split nut member 242c and fourth split nut member 242d, which are all substantially identical to one another except for the female acme thread segment formed thereon. As discussed above, when coupling assembly 210 is in its closed condition 232, the distal ends of the circumferentially arranged split nut members 242 that comprise part of the connector assembly's service valve-engaging portion 240 define segments of a female acme thread that are positioned to be threadedly coupled to the male acme thread of a fuel tank service valve.

Collar 236 has enlarged diameter proximal end 244 that facilitates its being grasped and moved along axis 238 by the hand of an operator. The outer substantially cylindrical surface of collar 236 may also be fluted, as shown, to improve the operators grip for sealably tightening connector 210 onto the service valve.

Collar 236 extends coaxially with the cylindrical bore 248 of fluid conduit member 228. Axial bore 248 extends the entire length of conduit member 228. Relative to its proximal end 220, the distal end 250 of conduit member 228 is diametrically enlarged. Distal conduit member end 250 is surrounded by the internally threaded distal ends of circumferentially arranged split nut members 242, and comprises part of service valve-engaging portion 240 of connector 210. The enlarged distal end 250 of conduit member 228 has an axial terminus defined by the free, minor diameter end of a convexly surfaced right cone portion 252. The opposite axial end of the convexly surfaced portion 252 has a major diameter that defines an outer surface continuous with that of adjacent, cylindrically surfaced portion 254 of conduit member 228. The axial end of cylindrically surfaced portion 254 opposite convexly surface portion 252 defines an annular, axially facing shoulder 256 that extends radially outward from the outer cylindrical surface of elongate cylindrical portion 258. Downstream of opposed flats 230, elongate cylindrical portion 258 is provided with a circumferential groove 260 into which is received external retaining or snap ring 262.

A first washer 264 having an internal diameter slightly larger than the diameter of cylindrical portion 258 of conduit member 228 is disposed about the conduit member adjacent to shoulder 256. The external diameter of washer 264 is substantially greater than that of enlarged cylindrically surfaced portion 254 at the distal end of conduit member 228. An identical second washer 266 is disposed about conduit member 228 adjacent and downstream relative to snap ring 262. Identical first and second washers 264, 266 may, for example, be made of 302/304 stainless steel. Disposed axially between washers 264 and 266 is integrally formed cylindrical hub 268 of collar 236. Hub 268 has a cylindrical inner surface 270 extending along axis 238 that slidably engages cylindrical portion 258 of conduit member 228, and a coaxial cylindrical outer surface 272 that radially interfaces larger diameter cylindrical inner surface 274 of collar 236.

Figure 9C:
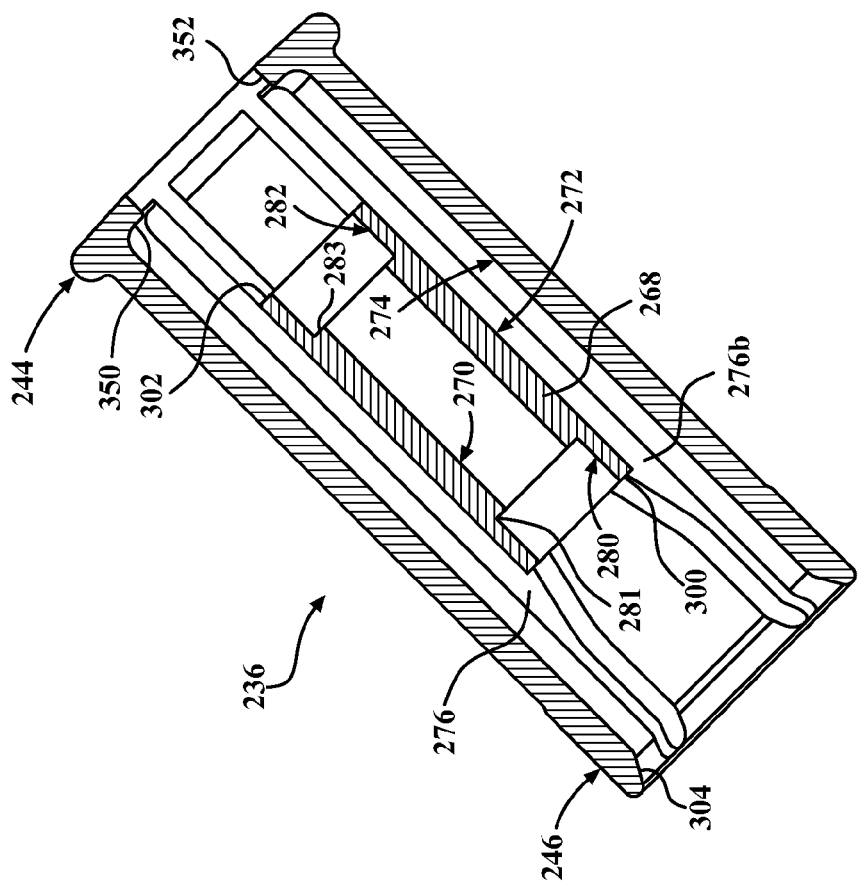
FIG. 9C is a cross-sectional view of the collar of FIG. 9B along line 9C-9C.
Figure 9B:
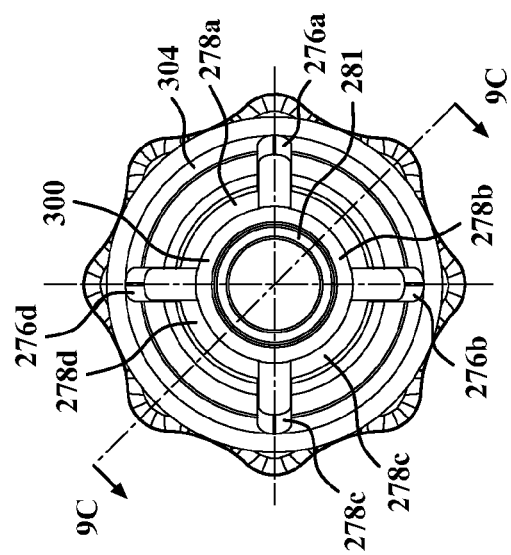
FIG. 9B is an end view of the collar of FIG. 9A in the direction indicated by arrow 9B.

Between cylindrical outer surface 272 of hub 268 and cylindrical inner surface 274 of collar 236 is a circumferentially distributed plurality of integrally formed, radially-extending axially elongate webs or walls 276. Referring to FIGS. 9 through 9C, the plurality of webs or walls 276 are angularly equidistance one from another about axis 238, and includes first web 276a, second web 276b, third web 276c and fourth web 276d. Arcuate windows 278 are defined by cylindrical outer surface 272 of hub 268, cylindrical inner surface 274 of collar 236, and pairs of circumferentially adjacent webs 276. A split nut member 242 is slidably disposed in each window 278. The plurality of arcuate windows 278 includes first window 278a in which first split nut member 242a is received, second window 278b in which split nut member 242b is received, third window 278c in which third split nut member 242c is received, and fourth window 278d in which fourth split nut member 242d is received. Thus, it is to be understood that windows 278, and the split nut members 242 therein contained, are circumferentially distributed equally about axis 238, each window and split nut member separated from its circumferentially adjacent neighbor by one of webs or walls 278.

Referring to FIGS. 7A, 7B and 9C, at opposite axial ends of central collar hub 268, its cylindrical inner surface 270 has first and second cylindrical counterbores 280, 282 that respectively define annular, axially facing shoulders 281, 283 that surround elongate conduit member cylindrical portion 258. First shoulder 281 faces the downstream direction; second shoulder 283 faces the upstream direction. First coiled compression spring 284 which may, for example, be 302 stainless steel, is disposed about conduit member 228 and is received in first counterbore 280, with the axially upstream end of spring 284 abutting first counterbore shoulder 281. Second coiled compression spring 286 which may, for example, be 17-7PH stainless steel, is similarly disposed about conduit member 228 and is received in second counterbore 282, with the axially downstream end of spring 286 abutting second counterbore shoulder 283. Second spring 286 has a spring rate higher than that of first, relatively lighter spring 284. For example, the load of first, light spring 284 at an axial length of 1.31 inches may be at least 1.50 lbs., and its load at an axial length of 0.50 inches may be 3.00±0.25 lbs.; and the load of second, heavier spring 286 at an axial length of 1.25 inches may be 6.00±0.50 lbs., and its load at an axial length of 0.38 inches may be no greater than 12.00 lbs.

Figure 14:
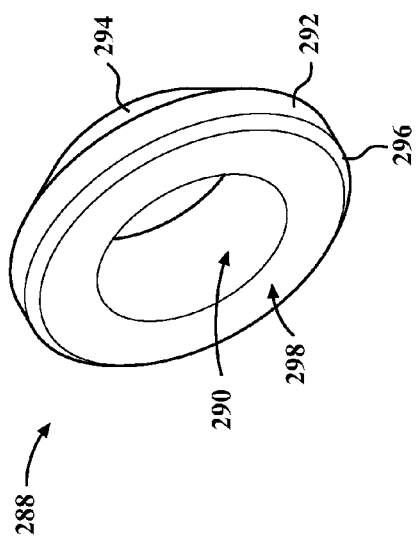
FIG. 14 is a perspective view of the conical bearing member of the quick fill connector of FIG. 8.
Figure 14B:
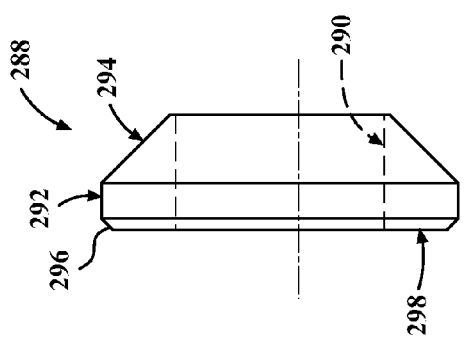
FIG. 14B is a side view of the conical bearing member of FIG. 14.
Figure 14A:
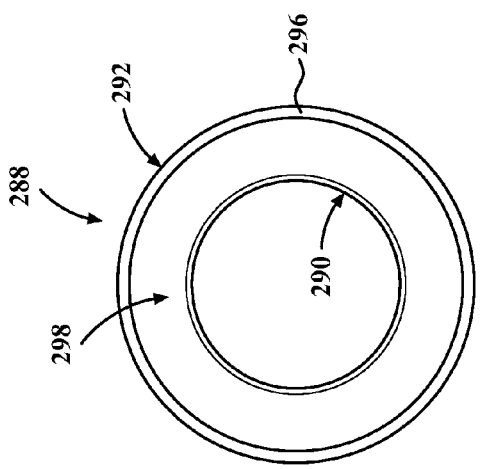
FIG. 14A is an end view of the conical bearing member of FIG. 14.

Disposed between first washer 264 and the interfacing axial end of first spring 284 is conical bearing member 288. Conical bearing member 288 may be formed of a nylon 6/6 material, and is provided with cylindrical inner surface 290 that slidably engages cylindrical portion 258 of conduit member 228. Bearing member 288 is also provided with a cylindrical outer surface 292 and a conical outer surface 294. Cylindrical outer surface 292 of conical bearing member 288 may be provided with a chamfer 296, as best seen in FIG. 14B, and between chamfer 296 and cylindrical inner surface 290, bearing 288 defines axial annular surface 298 that abuts the adjacent axial end of first, light compression spring 284, and superposes first annular shoulder 300 located on hub 268 about first counterbore 280. When bearing member annular surface 298 and hub shoulder 300 abut, first spring 284 is axially compressed to the length of first counterbore 280. At the axially opposite end of hub 268 is second annular shoulder 302 that surrounds second counterbore 282 and superposes second washer 266. When second washer 266 and hub shoulder 302 abut, second spring 286 is axially compressed to the length of second counterbore 282. The open distal end 246 of collar 236 is provided with annular, radially interior chamfer 304 that engages the radially outer surfaces of split nut members 242 when connector 210 is in its open condition 234.

Referring to FIGS. 10 through 13D, split nut members 242a, 242b, 242c, and 242d are respectively shown, each of the split nut members 242 being substantially identical to each other except for the internal acme thread formed on its distal end, and the indicia provided to readily identify the particular one of split nut members 242. Various views of first split nut member 242a are shown in FIGS. 10, 10A, 10B, 10C, and 10D. Corresponding views of second split nut member 242b are shown in FIGS. 11 through 11D; corresponding views of third split nut member 242c are shown in FIGS. 12 through 12D; and corresponding views of fourth split nut member 242d are shown in FIGS. 13 through 13D. The discussion of the common characteristics of split nut members 242 are discussed with reference to first split nut member 242a and FIGS. 10 through 10D.

Split nut members 242 may be machined or otherwise formed of a suitable material such as, for example, 304 stainless steel, which may be electropolished. Each split nut member 242 has a front or radially inner side 306 and a rear or radially outer side 308, between which are defined circumferentially left side 310 and circumferentially right side 312 that extend radially between front and rear sides 306, 308. As herein described, the terms "radially inner" and "radially outer" are relative to the installed positions of split nut members 242 and axis 238. Likewise, "circumferentially left" and "circumferentially right" are relative to the installed positions of split number members 242 as viewed along axis 238 from a downstream position.

Split nut members 242 are elongate and extend generally along axis 238 between their respective distal ends 314 and proximal ends 316. Thread form 318 is formed in front or radially inner side 306 and portions of circumferentially left 310 and right 312 sides of each split nut member 242 at its distal end 314.

As discussed above, split nut members 242a, 242b, 242c, and 242d are distinguished from one another by their respective internal acme thread forms 318 defined at their distal ends 314. First split nut member 242a includes first thread form 318a; second split nut member 242b includes second thread form 318b; third split nut member 242c includes third thread form 318c; and fourth split nut member 242d includes fourth thread form 318d. Thread forms 318a-d each define a circumferential segment of the female acme thread that, in closed condition 232, can be mated with the male acme thread of the service valve. The defined circumferential arrangement of split nut members 242a-d shown in the figures causes the end of one thread portion in the thread form 318 defined by one nut segment to be aligned with the end of a corresponding thread portion in the thread form 318 defined by the circumferentially adjacent nut segment. In closed condition 232, the alignment of the circumferentially adjacent thread portions extends across the gap between the adjacent nut segments in which is disposed one of webs or walls 276a-d of collar 236.

Circumferentially right side 312 of each split nut member 242a-d is provided with identifying indicia 320 near its distal end 314 that distinguishes it from the other split nut members. The respective indicia 320 may comprise a unique number of dimples formed in the flat surface of side 312. For example, first split nut member 242a includes indicium 320a in the form of a single dimple as best seen in FIG. 10D. Similarly, second split nut member 242b includes two-dimple indicium 320b as best seen in FIG. 11D; third split nut member 242c includes three-dimple indicium 320c as best seen in FIG. 12D; and fourth split nut member 242d includes four-dimple indicium 320d as best seen in FIG. 13D. Thus, with reference to FIGS. 7-7E, for example, the split nut members 242a-d may be easily arranged in proper sequence circumferentially about axis 238.

Returning to FIGS. 10 through 10D, each split nut member 242 has arcuate distal end axial surface 322 which is, in the closed condition 232, substantially flush with annular distal end axial surface 324 of conduit member 228, to define plane 326 in closed condition 232, as shown in FIGS. 7A and 7B. Plane 326 is normal to axis 238.

Each split nut member 242 has major outer radius of curvature 328, minor outer radius of curvature 330, major inner radius of curvature 332, and minor inner radius of curvature 334, as shown in FIG. 10. The origin of these radii of curvature coincide with axis 238 when split nut members 242 are installed in connector 210 and the connector is in its closed condition 232.

First cylindrical outer surface 336 of each split nut member 242 is defined at major outer radius of curvature 328 (relative to axis 238 in closed condition 232); and second cylindrical outer surface 337 is similarly defined at major radius of curvature 328. Surfaces 336 and 337 are respectively located on the distal and proximal ends 314, 316 of split nut member 242. Third cylindrical outer surface 338 located between distal and proximal ends 314, 316 is similarly defined at minor outer radius of curvature 330. Outer surfaces 336, 337 and 338 are located on rear or radially outer side 308 of each split nut member 242. On the front or radially inner side 306 of each split nut member 242 is first cylindrical inner surface 340 defined at major inner radius of curvature 332 (relative to axis 238 in closed condition 232). The second cylindrical inner surface 342 is similarly defined at minor inner radius of curvature 334. A first axial shoulder 344 facing the downstream direction is provided on each split nut member 242. A second axial shoulder 346 facing the upstream direction is provided on each split nut member 242 near proximal end 316. Second axial shoulders 346 of the plurality of split nut members 242 define the segments of a circular or annular shoulder and counterbore into which washer 266 may be received and against which the washer may be axially supported. The proximal axial end 348 of each split nut member 242 abuts the axially interior shoulder 350 near proximal end 244 of collar 236. Axially interior shoulder 350 is disposed about aperture 352 provided in the proximal end 244 of the collar 236, through which second washer 266 may pass with diametric clearance.

First outer frustoconical surface 356 is formed on rear surface 308 of each split nut member 242, between its first and third cylindrical outer surfaces 336 and 338. Second inner frustoconical surface 358 is formed on front surface 306 of each split nut member 242 between first and second cylindrical inner surfaces 340 and 342.

As best shown in FIGS. 7A and 7B, in the closed condition 232, first washer 264 is sandwiched between conduit member shoulder 256 and split nut member shoulders 344, frustoconical surfaces 358 abut the conical surface 294 of conical bearing member 288, and axial annual surface 298 of bearing member 288 abuts first annular shoulder 300 of collar hub 268. In closed condition 236, first, light spring 284 is contained entirely within counterbore 280. In closed condition 232, second annular shoulder 302 of collar hub 268 is maximally distanced from the interfacing axial surface of second washer 266, with the hub 268 and second washer 266 biased away from each other by second, heavy compression spring 286 disposed partially in counterbore 282. In closed condition 232, the first and second radially outer cylindrical surfaces 336, 337 of split nut members 242 are in contact with cylindrical inner surface 274 of collar 236, and first radially inner cylindrical surfaces are in contact with hub outer cylindrical surface 272, as best shown in FIG. 7B. In closed condition 232, second radially inner cylindrical surfaces 342 of split nut members 242 are slightly distanced radially from the cylindrical surface of elongate conduit member portion 258. Notably, the axial position of fluid conduit member 228 in the upstream direction relative to split nut members 242 is limited by the abutting engagement of conduit member shoulder 256, first washer 264, and shoulders 344 of split nut members 242, and therefore, tightening of connector 210 on the male acme threads of the service valve sealably engages convexly surfaces portion of the distal conduit member end 250 with the connector seat within the service valve port.

Further, with reference to FIGS. 7D and 7E, in the open condition 234, the outside diameter of first washer 264 is still greater than the expanded circumference defined by second inner cylindrical surfaces 342 of the split nut members 242 and therefore, first axial shoulders 344 of split nut members 242 axially interface first washer 264 in both the closed and open conditions 232, 234 of connector 210.

First, light spring 284 tends to bias coupling assembly 210 into its open condition 234, whereas second, heavy spring 286, which has a higher spring rate than spring 284, tends to bias coupling assembly 210 into its closed position 232, as one of ordinary skill in the art will understand from their comparative spring rates and FIGS. 7A, 7B, 7D, and 7E. Therefore, the natural condition of coupling 210 is the closed condition 232. Those of ordinary skill in the art will recognize that light, first spring 284 imparts an axial force component that acts through conical bearing member 288, the portion of split nut members 242 between their second inner frustoconical surfaces 358 and axial shoulders 344, and first washer 264 to bias the distal end 250 of conduit member 228 out of the distal end 246 of collar 236; and that light, first spring 284 also imparts a radial force component that acts through conical bearing member 288 and the split nut member second inner frustoconical surfaces 358 to bias the split nut member distal ends 314 radially away from conduit member 228, and thus bias service valve-engaging portion 240 into its expanded configuration, as best understood with reference to FIGS. 7A and 7D.

Those of ordinary skill in the art will also recognize that heavy, second spring 286 imparts a first axial force component that acts through second washer 266, snap ring 262 and fluid conduit member circumferential groove 260 to bias the conduit member proximal end 220 axially out of the proximal end 244 of collar 236 (in the upstream direction relative to collar 236); and that heavy, second spring 286 also imparts a second axial force component that additionally acts through conduit member axial shoulder 256, first washer 264, and split nut member first axial shoulders 344 to bias split nut member proximal axial ends 348 into abutment with collar axially interior shoulder 350.

In moving connector 210 from its closed condition 232 to its open condition 234, against the net axial force bias of springs 284, 286 towards the closed condition, collar 236 is moved by the operator in the upstream direction along axis 238 relative to conduit member 228. The relative spring rates of springs 284, 286 are such that movement of collar 236 in the upstream direction relative to fluid conduit member 228 forces the split nut members 242 out of the interior of collar 236, such that their distal ends 314 extend from collar distal end 246, without bringing second washer 266 into abutment with arcuate, second axial shoulders 346 formed in split nut member proximal ends 316.

As collar 236 is moved in the upstream direction relative to conduit member 228, the sliding engagement between frustoconical surfaces 358 of the split nut members 242 and frustoconical surface 294 of conical bearing member 288 urges the distal ends 314 of the split nut members 242 in radially outward directions relative to axis 238, under the radial force component imparted by light, first spring 284, as described above. As frustoconical surfaces 256 on the rear or radially outer sides 308 of the split nut members 242 reach annular chamfer 304 at collar distal end 246, and connector 210 reaches its open condition 234, the distal ends 314 of the split nut members 242 are permitted to radially separate and move away from axis 238, resulting in their radially expanded configuration shown in FIGS. 6A and 7C-7E.

Although second washer 266 may be received within the segmented counterbore 347 defined by arcuate shoulders 346, the spring rates are such that receipt of washer 266 into counterbore 347 would not necessarily occur in normal operation. If it were to occur, the fluid conduit member 228 would unnecessarily extend further along axis 238 in the downstream direction, moving the distal end axial surface 324 of conduit member 228 beyond plane 326. However, second washer 266 may be urged into counterbore 347 to distance it from circumferential fluid conduit member groove 260 and thereby facilitate the assembly of snap ring 262 into groove 260.

As coupling 210 is transitioned from its closed condition 232 towards its open condition 234, collar 236 is moved along axis 238 in the upstream direction relative to fluid conduit member 228, and reactions between frustoconical surfaces 358 of the split nut members 242 and the frustoconical surface of 294 of bearing member 288 force the split nut member distal ends 314 radially outward, under the biasing radial component of first spring 284. As first outer frustoconical surfaces 356 on split nut member rear surfaces 308 reach chamfer 304, the split nut members 242 pivot generally about their proximal ends 316, and more specifically about the arcuate regions of contact between hub cylindrical outer surface 272 and the radially inner boundaries of axial shoulders 346 located on first cylindrical inner surfaces 340, to the extent that split nut member third cylindrical outer surfaces 338 come into sliding or abutting engagement generally with the distal end 246 of collar 236, and more specifically with the arcuate juncture between collar cylindrical inner surface 274 and its chamfer 304, as best seen in FIGS. 7D and 7E.

As to a further discussion of the manner of usage and operation of the present invention, the same should be apparent from the above description. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, it is to be understood that the foregoing is merely representative of the preferred practice of the present invention and that various changes may be made in the arrangements and details of construction of the embodiment (s) disclosed herein without departing from the spirit and scope of the present invention. For example, aspects of connector 10 may be modified for use with service valve (adapter fitting) 150; aspects of connector 210 may be modified for use with adapter fitting 19; or connector 10 or 210 may be modified for use with conventional service valves of the type mounted to large residential fuel tanks, which have 1¾ inch acme threads and double check valve mechanisms. Therefore, it is intended that the invention not be limited to the particular embodiment(s) disclosed herein, but that the invention will include all embodiments falling within the scope of the appended claims.

What is claimed is:
1. A fluid connector having a longitudinal axis and selective open and closed conditions, comprising:
an elongate conduit member extending along the longitudinal axis;
an annular collar extending axially and disposed about and having axial movement relative to the conduit member along the longitudinal axis and between a connector open condition and a connector closed condition;

a plurality of split nut members circumferentially arranged about the conduit member and having radial movement relative to the longitudinal axis between the connector open condition and the connector closed condition, the plurality of split nut members and the collar jointly rotatable about the longitudinal axis, each split nut member having a distal end defining a threaded nut segment of a female thread that, in the connector closed condition, is adapted to mate with a male thread of a male fluid fitting;

wherein the split nut member distal ends in the connector closed condition are constrained by the collar against radially separating movement relative to the longitudinal axis and cooperatively define a nut configured to threadedly engage the mating fluid fitting; and wherein the split nut member distal ends in the connector open condition have an expanded configuration in which, relative to the connector closed condition, are radially separated from the longitudinal axis and not cooperatively positioned to threadedly engage the mating fluid fitting.

2. The fluid connector of claim 1, wherein the split nut member distal ends are disposed within the collar in the connector closed condition.

3. The fluid connector of claim 1, wherein the split nut member distal ends are radially positioned between the conduit member and the collar in the connector closed condition.

4. The fluid connector of claim 1, wherein the conduit member and collar each have a distal end, and the conduit member distal end and the split nut member distal ends extend axially outwardly from the collar distal end in the connector open condition.

5. The fluid connector of claim 4, wherein the conduit member distal end and the split nut member distal ends are surrounded by the collar distal end in the connector closed condition.

6. The fluid connector of claim 5, including a spring operatively engaged between the conduit member and the collar, the conduit member urged by the spring toward a position in which the conduit member distal end is surrounded by the collar distal end.

7. The fluid connector of claim 6, wherein the split nut members and conduit member are biased into engagement, and each of the split nut members being urged by the conduit member toward a position in which the split nut member distal ends are surrounded by the collar distal end.

8. The fluid connector of claim 5, wherein the split nut member distal ends are biased towards their expanded configuration.

9. The fluid connector of claim 8, wherein the split nut member distal ends are biased towards their expanded configuration in both the connector closed condition and the connector open condition.

10. The fluid connector of claim 8, further comprising a bearing member and a spring, the spring operatively engaged between the bearing member and the collar, the split nut member distal ends urged by the bearing member radially outwardly relative to the conduit member towards their expanded configuration.

11. The fluid connector of claim 10, wherein the split nut member distal ends are urged by the bearing member axially outwardly relative to the collar distal end.

12. The fluid connector of claim 11, wherein the bearing member has a substantially conical outer surface and the split nut members define segments of a substantially conical inner surface, each conical inner surface segment in sliding engagement with the bearing member conical outer surface, radial separation of each split nut member distal end relative to the conduit member induced by biasing forces imparted by the spring on the bearing member.

13. The fluid connector of claim 12, wherein the biasing forces imparted by the spring on the bearing member are directed along the longitudinal axis, and the radial separation of each split nut member distal end relative to the conduit member are induced through the engagement between the bearing member conical outer surface and the respective conical inner surface segment.

14. A fluid connector having a longitudinal axis and selective open and closed conditions, comprising:

an elongate conduit member extending along the longitudinal axis;

an annular collar extending axially and disposed about and having axial movement relative to the conduit member along the longitudinal axis and between a connector open condition and a connector closed condition;

a plurality of split nut members circumferentially arranged about the conduit member and having radial movement relative to the longitudinal axis between the connector open condition and the connector closed condition, the plurality of split nut members and the collar jointly rotatable about the longitudinal axis, each split nut member having a distal end defining a threaded nut segment;

wherein the split nut member distal ends in the connector closed condition are constrained by the collar against radially separating movement relative to the longitudinal axis and cooperatively define a nut configured to threadedly engage a mating fluid fitting;

wherein the split nut member distal ends in the connector open condition have an expanded configuration in which, relative to the connector closed condition, are radially separated from the longitudinal axis and not cooperatively positioned to threadedly engage the mating fluid fitting;

wherein the conduit member and collar each have a distal end, and the conduit member distal end and the split nut member distal ends extend axially outwardly from the collar distal end in the connector open condition;

wherein the conduit member distal end and the split nut member distal ends are surrounded by the collar distal end in the connector closed condition;

first and second springs and a bearing member, the first spring operatively engaged between the bearing member and the collar, the second spring operatively engaged between the conduit member and the collar;

wherein the split nut member distal ends are urged by the bearing member radially outwardly relative to the conduit member; and wherein the conduit member is urged by the second spring towards a position in which the conduit member distal end is surrounded by the collar distal end.

15. The fluid connector of claim 14, wherein the conduit member and each of the plurality of split nut members is provided with an axial shoulder, the shoulder of the conduit member and the shoulders of the split nut members facing in opposite axial directions and operatively engaged, and the split nut members are urged by the second spring toward a position in which the split nut member distal ends are surrounded by the collar distal end.

16. The fluid connector of claim 15, further comprising a washer surrounding the conduit member and in engagement with the conduit member axial shoulder and the plurality of split nut member axial shoulders, each split nut member axial shoulder and the washer having relative radial movement between the connector closed and open conditions.

17. A fluid connector for connecting to an inlet valve of a fuel canister, said fluid connector comprising:
   an elongate body having an outer end sized for fitting over an externally threaded end of an annular collar of the inlet valve so as to position said elongate body in alignment with the inlet valve;
   a plurality of split nut members movable inwardly and outwardly between engaged and disengaged positions with respect to said elongate body;
   a delivery conduit having at least a portion coaxially disposed within said elongate body and adapted to be coupled to a fluid delivery hose so as to receive pressurized fluid therein;
   each of said split nut members having a plurality of flanges spaced from one another and shaped to form an internally threaded end that, in the engaged position, is adapted to mate with and engage the externally threaded end of the annular collar to thereby hold said fluid connector in engagement with the inlet valve; and
   a biasing mechanism operable between a first state and a second state wherein said flanges on each of said split nut members are inwardly biased when said biasing mechanism is in said first state and said flanges on each of said split nut members are movable outwardly when a user manually compresses said biasing mechanism to place said biasing mechanism in said second state, said biasing mechanism being manually releasable to automatically shift from said second state to said first state so that said split nut members move from said disengaged position to said engaged position to engage the inlet valve.

18. A fluid connector for connecting to an inlet valve of a fuel canister, said fluid connector comprising:
   an elongate body having an outer end sized for fitting over an externally threaded end of an annular collar of the inlet valve so as to position said elongate body in alignment with the inlet valve;
   a plurality of split nut members movable inwardly and outwardly between engaged and disengaged positions with respect to said elongate body;
   a delivery conduit having at least a portion coaxially disposed within said elongate body and adapted to be coupled to a fluid delivery hose so as to receive pressurized fluid therein;
   each of said split nut members having a plurality of inwardly extending flanges spaced from one another and shaped to form an internally threaded end that, in the engaged position, is adapted to mate with and engage the externally threaded end of the annular collar to thereby hold said fluid connector in engagement with the inlet valve;
   a biasing mechanism operable between a first state and a second state wherein said flanges on each of said split nut members are inwardly biased when said biasing mechanism is in said first state and said flanges on each of said split nut members are movable outwardly when a user manually compresses said biasing mechanism to place said biasing mechanism in said second state, said biasing mechanism being manually releasable to automatically shift from said second state to said first state so that said split nut members move from said disengaged position to said engaged position to engage the inlet valve; and
   wherein said biasing mechanism includes a spring coaxially disposed about said delivery conduit whereby the user moves said elongate body relative to said delivery conduit to manually compress said spring and place said biasing mechanism in said second state so that said split nut members move outwardly to said disengaged position.

* * * * *